United States Patent
Kobayashi et al.

(10) Patent No.: US 10,377,500 B2
(45) Date of Patent: Aug. 13, 2019

(54) ELECTRIFIED AIRCRAFT AND METHOD OF CONTROLLING REGENERATIVE ELECTRIC POWER OF ELECTRIFIED AIRCRAFT

(71) Applicant: Japan Aerospace Exploration Agency, Tokyo (JP)

(72) Inventors: Hiroshi Kobayashi, Tokyo (JP); Akira Nishizawa, Tokyo (JP); Tomoko Iijima, Tokyo (JP); Takeshi Tagashira, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 488 days.

(21) Appl. No.: 15/129,298

(22) PCT Filed: Mar. 12, 2015

(86) PCT No.: PCT/JP2015/057317
§ 371 (c)(1),
(2) Date: Mar. 8, 2017

(87) PCT Pub. No.: WO2015/146608
PCT Pub. Date: Oct. 1, 2015

(65) Prior Publication Data
US 2018/0127104 A1    May 10, 2018

(30) Foreign Application Priority Data

| Mar. 26, 2014 | (JP) | 2014-064584 |
| Mar. 26, 2014 | (JP) | 2014-064585 |
| Mar. 26, 2014 | (JP) | 2014-064586 |

(51) Int. Cl.
*B64D 27/24* (2006.01)

(52) U.S. Cl.
CPC ........ *B64D 27/24* (2013.01); *B64C 2201/021* (2013.01); *Y02T 10/7258* (2013.01); *Y02T 50/64* (2013.01)

(58) Field of Classification Search
CPC . B64D 27/24; Y02T 10/7258; Y02T 10/7283; Y02T 50/62; Y02T 50/64
See application file for complete search history.

(56) References Cited

U.S. PATENT DOCUMENTS

| 5,106,035 A | * | 4/1992 | Langford, III | B64D 27/24 244/53 R |
| 6,986,668 B2 | * | 1/2006 | Brodsky | H01L 23/4006 439/66 |

(Continued)

FOREIGN PATENT DOCUMENTS

| DE | 198 28 720 A1 | 12/1999 | |
| EP | 3418504 A1 | * 12/2018 | B64D 45/00 |

(Continued)

OTHER PUBLICATIONS

Galvão, F. L., "A Note on Glider Electric Propulsion," *Technical Soaring*, Oct.-Dec. 2012, 36(4):94-101.

(Continued)

*Primary Examiner* — Christopher P Ellis
(74) *Attorney, Agent, or Firm* — Saliwanchik, Lloyd & Eisenschenk

(57) ABSTRACT

To provide an electrified aircraft, and a method of controlling a regenerative electric power of the electrified aircraft where a path angle and a descending rate can be controlled with a good response independently from a speed while controlling the drag force of the propulsion drive system and where it is possible to maximize safely a generated electric power in each flight status at the time of descent or ascent. The electrified aircraft includes a propeller or a fan for propulsion; an electric drive motor for rotary-driving the (Continued)

propeller or the fan and for generating an electric power by the rotation of the propeller or the fan; and an estimation unit for estimating a drag force of the propeller or the fan or an electric power generation amount of the electric drive motor based on propulsion system parameters of the electric drive motor.

18 Claims, 16 Drawing Sheets

(56) References Cited

U.S. PATENT DOCUMENTS

| | | |
|---|---|---|
| 6,986,688 B1 | 1/2006 | Jansen |
| 2008/0006739 A1* | 1/2008 | Mochida ................. B64C 27/04 244/60 |
| 2011/0029158 A1 | 2/2011 | Klooster |
| 2012/0181388 A1 | 7/2012 | Cowley |
| 2014/0129056 A1* | 5/2014 | Criado ................... G05D 1/105 701/4 |
| 2014/0257599 A1* | 9/2014 | Kobayashi ............. B64D 31/06 701/3 |
| 2016/0052423 A1* | 2/2016 | Zhou ....................... B60L 15/06 701/22 |
| 2016/0221467 A1* | 8/2016 | Suzuki .................... B60L 15/20 |
| 2016/0368488 A1* | 12/2016 | Sato ....................... B60W 10/08 |
| 2017/0190435 A1* | 7/2017 | Kobayashi ............. B64D 27/24 |
| 2017/0210481 A1* | 7/2017 | Bak ........................ B64D 27/24 |
| 2018/0111497 A1* | 4/2018 | Li ........................ B60L 11/1861 |
| 2018/0118364 A1* | 5/2018 | Golshany ............... B64D 35/08 |
| 2018/0148162 A1* | 5/2018 | Trahmer ............... B64C 1/0009 |

FOREIGN PATENT DOCUMENTS

| | | |
|---|---|---|
| JP | 7-315297 A | 12/1995 |
| JP | 3942570 B2 | 7/2007 |
| JP | 2011031879 A | 2/2011 |
| JP | 5046104 B2 | 10/2012 |
| JP | 2013169972 A | 9/2013 |
| JP | 2014172435 A | 9/2014 |
| WO | WO-2014020596 A1 | 2/2014 |
| WO | WO-2014053057 A1 | 4/2014 |
| WO | WO-2014089509 A1 | 6/2014 |

OTHER PUBLICATIONS

International Search Report in International Application No. PCT/JP2015/057317, Filed Mar. 12, 2015.

* cited by examiner

ELECTRIFIED AIRCRAFT AND METHOD OF CONTROLLING REGENERATIVE ELECTRIC POWER OF ELECTRIFIED AIRCRAFT

CROSS-REFERENCE TO RELATED APPLICATIONS

This application is the U.S. national stage application of International Patent Application No. PCT/JP2015/057317, filed Mar. 12, 2015; which claims priority to Japanese Application Nos. 2014-064584, filed Mar. 26, 2014; 2014-064585, filed Mar. 26, 2014; and 2014-064586, filed Mar. 26, 2014, the disclosures of each of which are incorporated herein by reference in their entirety.

TECHNICAL FIELD

The present invention relates to an electrified aircraft having a propulsion drive system driven by an electric drive motor, and a method of controlling a regenerative electric power of the electrified aircraft.

BACKGROUND ART

In a general aircraft, an aerodynamic device such as an elevator and a spoiler is used for adjusting a path angle at the time of descent so that an airframe is not deviated from a desirable path.

The aerodynamic device may change both of the path angle and an airspeed.

For example, as shown in FIG. 29, the aerodynamic device normally has to proceed at the path angle shown by a solid line. When the airspeed is operated by the aerodynamic device, the path angle is changed. Actually, other operations for repeatedly modifying the path angle may result in a path shown by a dotted line.

Accordingly, the operation tends to be complex. In addition, once gusty wind attacks the aerodynamic device, workloads of a pilot significantly increase, thereby causing safety issues.

This is because an existing aerodynamic device changes not only a drag force but also a lift force of the airframe and the path angle or the descending rate cannot be controlled directly.

On the other hand, in an electrified aircraft having a propulsion drive system driven by an electric drive motor, it is possible to use the propeller or the fan not only for propulsion but also for generating an electric power (see Patent Document 1). At the time, the drag force opposite to the drive force at the time of propulsion is generated at the propeller or the fan.

Patent Document 1: Japanese Patent No. 3942570

SUMMARY OF INVENTION

Problem to be Solved by the Invention

However, an object of the method described in Patent Document 1 is to recover an electric power if a flight status can be kept in an electrified aircraft, to reduce an energy amount spent for a flight in the sky, and to fly in the sky for a long period of time. It is not taken into account that a drag force is controlled by a propulsion drive system.

If the drag force is tried to be controlled, the propeller or the fan is rotated reversely at the time of propulsion. Therefore, a pitch angle has to be significantly changed, and the propeller or the fan has to be reversely rotated, which results in a long operation time and a very low response.

Accordingly, it is difficult to control the path angle and the descending rate with a good response independently from a speed while controlling the drag force.

Also, in the method, a generated electric power becomes small. In an energy saving point of view, it is insufficient.

Then, an object of the present invention is to provide an electrified aircraft, and a method of controlling a regenerative electric power of the electrified aircraft where a path angle and a descending rate can be controlled with a good response independently from a speed while controlling the drag force of the propulsion drive system and where it is possible to maximize safely a generated electric power in each flight status at the time of descent or ascent.

Means for Solving the Problem

An electrified aircraft according to an embodiment of the present invention includes a propeller or a fan for propulsion; an electric drive motor for rotary-driving the propeller or the fan and for generating an electric power by the rotation of the propeller or the fan; and an estimation unit for estimating a drag force of the propeller or the fan, and torque or for estimating generated electric power of the electric drive motor based on propulsion system parameters of the electric drive motor.

By estimating the drag force of the propeller or the fan, or the torque or for estimating the generated electric power of the electric drive motor, the rotation number or a command value of the torque is fed back, thereby maximizing regenerative energy.

The electrified aircraft according to an embodiment of the present invention further includes a control unit for controlling a rotation number and a rotation direction of the propeller or the fan based on the drag or generated electric power estimated.

In the electrified aircraft according to an embodiment of the present invention, the propeller or the fan is a variable pitch propeller or a variable pitch fan, and the control unit controls such that the propeller or the fan is rotated in the same rotation direction at the time of generating electric power and at the time of propulsion, and the pitch angle at the time of generating an electric power of the propeller or the fan is shallower than the pitch angle at the time of propulsion, or the rotation number at the time of generating an electric power is lower than the rotation number at the time of propulsion.

In the electrified aircraft according to an embodiment of the present invention, the control unit controls torque to a range including both cases that the propeller or the fan is rotated in the same rotation direction at the time of propulsion to generate an electric power and that the propeller or the fan is rotary-driven in an opposite direction at the time of propulsion.

The electrified aircraft according to an embodiment of the present invention includes a function to control an airspeed of the electrified aircraft independent of the rotation number and the rotation direction of the propeller or the fan by operating an aerodynamic device installed on a wing or a tail.

When the path angle is designated within a certain range by an airspace limitation, for example, or when the path angle and the airspeed cannot be controlled independently (the airspeed becomes a function of the path angle), the airspeed determined by the path angle may not have a sufficient margin to a stalling speed depending on a status and a configuration (for example, with a flap or no flap) of an airframe. However, by the independent control as described above, a safe landing is possible where the airspeed is sufficiently larger than the stalling speed not depending on the path angle to a runway.

The electrified aircraft according to an embodiment of the present invention further includes an operation unit for operating a motor output of the electric drive motor, and operating the torque and the generated electric power of the electric drive motor as a negative value of the motor output.

In the electrified aircraft according to an embodiment of the present invention, the operation unit operates the generated electric power of the electric drive motor as a value proportional to cube of the rotation number of the motor or motor torque at the time of generating an electric power as a value proportional to square of the rotation number of the motor.

The electrified aircraft according to an embodiment of the present invention further includes an airflow detection unit for detecting an airspeed or a dynamic pressure, in which an output of the electric drive motor is increased or decreased depending on the airspeed or the dynamic pressure detected when the output of the motor is operated by the operation unit as a negative value.

Here it is possible to detect an airflow by detecting the dynamic pressure using a pitot tube, for example.

In the electrified aircraft according to an embodiment of the present invention, the operation unit is a single operation member.

In the electrified aircraft according to an embodiment of the present invention, the operation unit is configured to operate the operation member from a predetermined position to a predetermined direction and an opposite direction, to increase the output of the electric drive motor to the operation of the operation member in the predetermined direction, and to decrease the output of the electric drive motor including a negative value to the operation of the operation member to the opposite direction.

In the electrified aircraft according to an embodiment of the present invention, the operation member is operated in the direction where the output of the electric drive motor is decreased including a negative value, and the output of the motor is increased at an area where the motor is rotated in a direction opposite to a propulsion status of the motor when the operation member is further operated in the same direction.

In the electrified aircraft according to an embodiment of the present invention, the operation unit includes a wrong operation prevention mechanism for requesting an operator to an additional operation when the operation member is operated from the predetermined position to the opposite position.

In the electrified aircraft according to an embodiment of the present invention, the operation unit includes a plurality of operation position detection sensors each for detecting a position of the operation member, and a failure detection mechanism for detecting a failure of any of a plurality of the operation position detection sensors by comparing outputs of a plurality of the operation position detection sensors.

The electrified aircraft according to an embodiment of the present invention further includes a display unit for displaying torque or generated electric power of the electric drive motor as a negative value.

In the electrified aircraft according to an embodiment of the present invention, the display unit displays a recoverable range of regenerative energy recovered by generating electric power by the electric drive motor.

In the electrified aircraft according to an embodiment of the present invention, the display unit displays at least one or more values of a maximum value of a generated electric power of the electric drive motor estimated at the time, a maximum value of a motor axis input, a maximum value of a current and a maximum value of torque, an estimated value of a drag force at the time of generating an electric power, an estimated value of an airframe elevator ratio, an estimated value of a path angle and an estimated value of a lift-drag ratio, or processing information thereof.

The electrified aircraft according to an embodiment of the present invention includes at least one of: a motor temperature detection means for detecting a motor temperature of the electric drive motor, a buttery temperature detection means for detecting a temperature of a buttery mounted to the electrified aircraft, and a current detection means for detecting a current flowing from the electric drive motor, in which the display unit displays based on data provided from the motor temperature detection means, the buttery temperature detection means and/or the current detection means.

A method of controlling a regenerative electric power of an electrified aircraft according to an embodiment of the present invention includes estimating a drag force of a propeller a fan of an electrified aircraft, or estimating torque or generated electric power of an electric drive motor based on propulsion system parameters of the electric drive motor for rotary-driving the propeller or the fan for generating an electric power by the rotation of the propeller or the fan; and controlling torque or a rotation number of the propeller or the fan based on an estimated result.

Effects of the Invention

According to the present invention, by estimating the drag force of the propeller or the fan based on the propulsion system parameters of the electric drive motor, the path angle and the descending rate can be controlled with a good response independently from a speed while controlling the drag force of the propulsion system and it is possible to maximize safely a generated electric power in each flight status at the time of descent or ascent.

MODES FOR CARRYING OUT THE INVENTION

Figure 1:
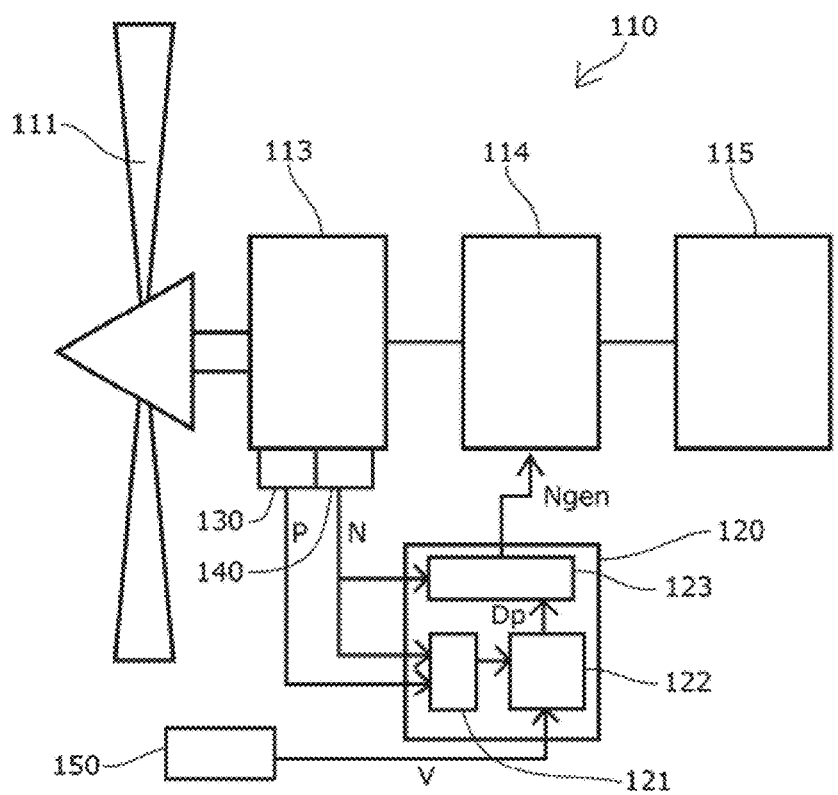
FIG. 1 An explanatory diagram of a propulsion drive system of an electrified aircraft according to a first embodiment.

An electrified aircraft according to an embodiment of the present invention includes an electric drive motor for rotary-driving a propeller or a fan and for generating an electric power by the rotation of the propeller or the fan, a current detection means for detecting a current of the electric drive motor, a rotation number detection means for detecting a rotation number of the electric drive motor, an airflow detection means for detecting an airspeed or an atmospheric density, and a drive control means for controlling the electric drive motor, in which the drive control means has a driving force operation unit that estimates torque of the electric drive motor from a current detected at the current detection means, a drag operation unit that estimates a drag force of the propeller or the fan, and a thrust force control unit that changes one or both of the torque and the rotation number of the electric drive motor, and in which the drag operation unit estimates the drag force of the propeller or the fan from the rotation number detected at the rotation number detection means or the torque estimated at the driving force operation unit and the airspeed detected at the airflow detection means using a data group relating to propeller properties stored in advance.

According to the electrified aircraft of the present invention, the drag operation unit estimates the drag force of the propeller or the fan from the rotation number detected at the rotation number detection means or the torque estimated at the driving force operation unit and the airspeed detected at the airflow detection means using a data group relating to propeller properties stored in advance, whereby an accurate and optimal operation is possible at high speed corresponding to specifications of an airframe under control.

In addition, the drive control means has the drag operation unit that estimates the drag force of the propeller or the fan, and the thrust force control unit that changes one or both of the torque and the rotation number of the electric drive motor, whereby the electric drive motor with high responsiveness is controlled corresponding to the drag force of the propeller or the fan estimated at high speed to allow only the drag force of an aircraft to be operated freely with a good response.

The drive control means increase or decrease the drag force of the propeller or the fan at the time of generating an electric power of the electric drive motor to control an elevator ratio or a path angle, whereby the elevator ratio or the path angle can be controlled with a good response independently from a speed and the electric power generated can be regenerated.

The drive control means changes a rotation number or a pitch of the propeller or the fan such that a rotation direction of the propeller or the fan is not changed at the time of propulsion and at the time of generating an electric power, thereby controlling the switching continuously and smoothly between the time of propulsion and the time of generating an electric power with high responsiveness, and improving an electric power generation efficiency.

The drive control means changes the rotation number or the pitch of the propeller or the fan and controls the generated electric power and the elevator ratio or the path angle independently, whereby the elevator ratio or the path angle can be controlled with a good response while maximizing an electric power generation efficiency.

The drive control means changes the drag force of the propeller or the fan and has a function to control the elevator ratio or the path angle and the airspeed independently by operating an aerodynamic device installed on a wing or a tail, whereby the elevator ratio or the path angle can be controlled accurately and the elevator ratio or the path angle can be controlled with a good response while maximizing an electric power generation efficiency.

Furthermore, by adding the control to change the pitch, the electric power generation efficiency can be further improved.

Corresponding to at least one of an airframe height provided from an airframe height detection means, a motor temperature provided from a motor temperature detection means, a buttery temperature provided from a buttery temperature detection means or a buttery status of charge provided from a buttery status of charge detection means, the elevator ratio or the path angle is controlled, thereby improving safety of a whole airframe without deviating from limitations by a descending rate, an electric power, an airframe height, a temperature of a propulsion system and a buttery status of charge.

In a general aircraft, an aerodynamic device such as an elevator and a spoiler is used for adjusting a path angle at the time of descent so that an airframe is not deviated from a desirable path. Steering is generally carried out separately for each device, a steering feeing is not intuitive for an immature pilot, workloads are increased by an increase in matters to be operated, and a risk of a wrong operation increases.

In the control of the path angle and electric power generation amount, when a pilot operates parameters in relation to the electric power generation, it is desirable to increase reliability and decrease workloads.

In addition, when an electric power is generated using the propeller or the fan for propulsion, there is an area where the rotation number of the propeller or the fan becomes unstable as generated electric power increases. In the control of the electric drive motor, when a pilot carries out only a typical torque command value input, it is difficult to generate an electric power stably, and a care should be taken not to transit unintentionally to an electric power generation status that generates the drag force.

In addition, these parameters depend not only on an airflow status such as an airspeed and an atmospheric density and an operation status of a propulsion system, but on safety limitations by the descending rate, the electric power, the airframe height, the temperature of the propulsion system and the buttery status of charge. Constantly requesting adequate operation inputs to a pilot during landing and descent might cause an issue that workloads are increased.

An object of the present invention is to provide an operation system of an electrified aircraft where a path angle and a descending rate can be controlled with a good response independently from a speed by operating a drag force of a propulsion drive system and a generated electric power can be recovered at the time of descent or ascent; the electrified aircraft can be operated easily while an airframe safety is kept in each flight status.

An operation system of an electrified aircraft according to an embodiment of the present invention includes an electric drive motor for rotary-driving a propeller or a fan, a drive control means for controlling the electric drive motor, and an operation means for commanding to the drive control means, the operation means is configured to command to the drive control means such that an operation amount by an operator is corresponded to any of a torque command value, a rotation number command value, an output command value of the electric drive motor, a thrust force command value of the propeller or the fan, and an operation range of the operation means includes a command that an output of the electric drive motor controlled by the drive control means becomes a negative value, thereby solving the problem.

In the operation system of the electrified aircraft according to an embodiment of the present invention, the operation means is configured to command to the drive control means such that the operation amount by the operator is corresponded to any of the torque command value, the rotation number command value, the output command value of the electric drive motor, the thrust force command value of the propeller or the fan, and the operation range of the operation means includes the command that the output of the electric drive motor controlled by the drive control means becomes a negative value. By the operation of the operator such as a pilot, similar to the aircraft in the related art, a thrust force of the propulsion drive system can be operated, the thrust force of the propulsion drive system is operated easily to control the path angle and the descending rate with a good response independently from a speed.

By operating the operation means, a generated electric power can be controlled to a target at the time of descent or ascent.

Then, when the drag force of the propulsion drive system and the control of an electric power generation amount are carried out, the path angle and the descending rate are controlled independently from the speed, thereby decreasing the workloads of the operator.

In addition, the limitations of the descending rate and the path angle by the height, the temperature of the propulsion system, etc. are reflected to the command values, whereby the airframe will not fall into a dangerous status and the workloads of the operator can be decreased.

The drag operation unit estimates the drag force of the propeller or the fan from the rotation number detected at the rotation number detection means or the torque estimated at the driving force operation unit and the airspeed detected at the airflow detection means using a data group relating to propeller properties stored in advance, whereby an accurate and optimal operation is possible at high speed corresponding to specifications of an airframe under control.

In addition, the drive control means has the drag operation unit that estimates the drag force of the propeller or the fan, and the thrust force control unit that changes one or both of the torque and the rotation number of the electric drive motor, the thrust force control unit converts the thrust force command value of the propeller or the fan or the output command value of the electric drive motor into the torque or the rotation number command value of the electric drive motor, whereby the electric drive motor with high responsiveness is controlled corresponding to the drag force of the propeller or the fan estimated at high speed to allow only the drag force of an aircraft to be operated freely with a good response.

The drive control means increase or decrease the output of the electric drive motor depending on the airspeed detected by the airflow detection means when the command that the output of the electric drive motor becomes a negative value, whereby an electric power generation efficiency can be improved, the drag force is prevented from excessively increasing at the time of generating an electric power, and the operation can operate safely.

The operation means is a single operation member, whereby an operator such as a pilot can operate easily, and a less complex cockpit is achieved.

The operation means is configured to operate the operation member from a predetermined position to a predetermined direction and an opposite direction, depending on a command to the drive control means by the operation of the operation member to the predetermined direction, the drive control means increases the output of the electric drive motor, and depending on a command to the drive control means by the operation of the operation member to the opposite direction, the drive control means decreases the output of the electric drive motor including a negative value. The operation from the predetermined position to the predetermined direction is an increase or decrease of a thrust force found in the aircraft in the related art, and the operation to the opposite direction is a control of the drag force or a control of the electric power generation amount. Thus, it is possible to operate easily for an operator such as a pilot who is familiar with the aircraft in the related art.

The operation means includes a wrong operation prevention mechanism for requesting an operator to an additional operation when the operation member is operated from the predetermined position to the opposite position. When the thrust force is operated as found in the aircraft in the related art, it is prevented to transit unintentionally to control the drag force or control the electric power generation amount, and it is possible to operate safely.

The operation means includes a plurality of operation position detection sensors each for detecting a position of the operation member, and a failure detection mechanism for detecting a failure of any of a plurality of the operation position detection sensors by comparing outputs of a plurality of the operation position detection sensors. When the thrust force is operated as found in the aircraft in the related art, by a failure of the operation position detection sensors, it is prevented to transit unintentionally to control the drag force or control the electric power generation amount not present in the aircraft in the related art before it happens, thereby further improving safety.

Corresponding to at least one of an airframe height provided from an airframe height detection means, a motor temperature provided from a motor temperature detection means, a buttery temperature provided from a buttery temperature detection means or a buttery status of charge provided from a buttery status of charge detection means, a command value corresponding to the elevator ratio or the path angle is controlled, thereby improving safety of a whole airframe without deviating from limitations by a descending rate, an electric power, an airframe height, a temperature of a propulsion system and a buttery status of charge.

Here, in a general aircraft, an aerodynamic device such as an elevator and a spoiler is used for adjusting a path angle at the time of descent so that an airframe is not deviated from a desirable path. Steering is generally carried out separately for each device, a steering feeing is not intuitive for an immature pilot, workloads are increased by an increase in matters to be operated, and a risk of a wrong operation increases.

In the control of the path angle and generated electric power, when a pilot operates parameters in relation to the electric power generation, it is desirable to increase reliability and decrease workloads.

In addition, when an electric power is generated using the propeller or the fan for propulsion, there is an area where the rotation number of the propeller or the fan becomes unstable as generated electric power increases. In the control of the electric drive motor, when a pilot carries out only a typical torque command value input, it is difficult to generate an electric power stably, and a care should be taken not to transit unintentionally to an electric power generation status that generates the drag force.

For an efficient operation and an enhanced safety, it is very important to notification promptly to a pilot of information about parameters in relation to a flight performance such as the descending rate and a lift-drag ratio of the airframe attributed to the drag force generated as well as a propulsion status or a regenerative status, propulsion system parameters such as a drive output and a regenerative electric power and a sustainable time.

In general, when the propulsion system parameters are displayed in the operation of the aircraft, a variety of display methods are considered in order to improve a status recognition by a pilot in view of a wrong operation prevention or an accident prevention.

However, there parameters depend on an airflow status such as an airspeed and an atmospheric density (height) and an operation status of a propulsion system, and are limited by a descending rate, an electric power, an airframe height, and a temperature of a propulsion system. In an internal combustion system where a model of an operation status is complex or modeling is difficult, it has been hard to simply notify of the information.

In particular, if an airframe system is more automated in the future, a present operation status has to be clearly shown to the pilot for a false recognition prevention or an efficient operation.

In the past ADVTECH machine (Advanced Technology Machine: airframe including an autopilot and an FMS (Flight Management System)), many accidents occur by misrecognizing a mode by the autopilot.

Similarly, if the operation status of the propulsion system is misrecognized, other matters to be operated are operated similarly at the time of propulsion despite of an energy regenerative operation. There is a possibility to significantly inhibit safety, e.g., an increase in an airframe resistance. Therefore a notifying method is very important to notify intuitively a pilot of an operation status of a propulsion system as well as information including a safety margin.

For example, a degree of recognition of the display relates to the operation of the matters to be operated by the pilot. When the operation amount is displayed, Human Factors Consideration is suggested: "there is no strangeness feeling between the operation direction and the display direction" and "there is no strangeness feeling between the operation amount and a displayed size thereof".

When the propulsion system parameters relating to regeneration are displayed, it is necessary to eliminate strangeness feeling among an operation direction, an operation amount and a display of an operation device.

An object of an embodiment of the present invention is to provide a display system of an electrified aircraft where a path angle or a descending rate can be controlled with a good response independently from a speed by operating a drag force of a propulsion drive system and a regenerated electric power can be recovered at the time of descent or ascent; the display system being capable of suppressing a false recognition and simply notifying information for controlling safely the electrified aircraft.

A display system of an electrified aircraft according to an embodiment of the present invention includes an electric drive motor for rotary-driving the propeller or the fan, a drive control means for controlling the electric drive motor, and an information display means, in which the information display means is configured to include a control that an output of the electric drive motor is a negative value, and the information display means displays at least any or both values of an electric power generation amount detected or estimated and a drag fro of the propeller or the fan or processing information thereof, thereby solving the problem.

By the display system of an electrified aircraft according to the present invention, the drive control means is configured to include a control that an output of the electric drive motor is a negative value, the elevator ratio or the path angle can be controlled independently from the speed by controlling the drag force of the propulsion drive system, or generated electric power can be controlled to a target at the time of descent or ascent.

The information display means displays at least any or both values of an electric power generation amount detected or estimated and a drag fro of the propeller or the fan or processing information thereof, thereby suppressing a false recognition and simply notifying information necessary for controlling safely the drag force of the propulsion drive system or the generated electric power.

The drag operation unit estimates the drag force of the propeller or the fan from the rotation number detected at the rotation number detection means or the torque estimated at the driving force operation unit and the airspeed detected at the airflow detection means using a data group relating to propeller properties stored in advance, whereby an accurate and optimal operation is possible at high speed corresponding to specifications of an airframe under control.

In addition, the drive control means has the drag operation unit that estimates the drag force of the propeller or the fan, and the thrust force control unit that changes one or both of the torque and the rotation number of the electric drive motor, the thrust force control unit converts the thrust force command value of the propeller or the fan or the output command value of the electric drive motor into the torque or the rotation number command value of the electric drive motor, whereby the electric drive motor with high responsiveness is controlled corresponding to the drag force of the propeller or the fan estimated at high speed to allow only the drag force of an aircraft to be operated freely with a good response.

A value or processing information displayed by the information display means includes at least one or more of a current detected or estimated, torque and a rotation number or processing information thereof, thereby suppressing a false recognition and simply notifying necessary information necessary.

Corresponding to at least one of an airframe height provided from an airframe height detection means, a motor temperature provided from a motor temperature detection means, a buttery temperature provided from a buttery temperature detection means or a buttery status of charge provided from a buttery status of charge detection means, a display mode of the value or the processing information thereof is changed, thereby changing the display mode depending on limitations by an airflow status, an operation status of a propulsion system, a descending rate, an electric power, an airframe height, a temperature of a propulsion system to achieve false recognition suppression and a simple notification.

In this manner, an operator such as a pilot can recognize intuitively information about a propulsion system or an electric power system not depending on a flight status, workloads are decreased, an adequate output operation can be made, and safety of a whole airframe is improved.

The value or processing information displayed by the information display means includes at least one or more of values of a maximum value of the generated electric power of the electric drive motor estimated at the time, a maximum value of a motor axis input, a maximum value of a current and a maximum value of torque or processing information, whereby information about an electric power consumption, a target for controlling an electric power generation amount and a safety margin in addition to a present status can be displayed, and safety is further improved under control in view of energy saving.

In this manner, an operator such as a pilot can recognize information about a regenerative electric power, a current and a safety margin to be provided, workloads are decreased, and safety of a whole airframe is improved.

The value or processing information displayed by the information display means includes at least one or more of values of an estimated value of a drag force at the time of generating an electric power, an estimated value of an airframe elevator ratio and an estimated value of a lift-drag ratio, or processing information thereof, whereby information about a target for controlling a propulsion force and a drag force and a safety margin in addition to a present status can be displayed, and safety is further improved when the path angle and the descending rate are controlled independently from the speed.

In this manner, an operator such as a pilot can recognize information about a lift-drag ratio, a descending rate and a safety margin to be provided, whereby a fuel efficiency and an airframe control performance are improved, and safety of a whole airframe is improved.

The information display means displays a time to arrive a temperature time-rate-of-change or a threshold value of a motor or a buttery, whereby an operator such as a pilot can recognize information about a temporal safety margin of a whole airframe in addition to a present operation status of the propulsion system.

Hereinafter, embodiments of the present invention will be described referring to the drawings.

An electrified aircraft according to the embodiments of the present invention will be described.

First Embodiment

FIG. 1 is an explanatory diagram of a propulsion drive system of an electrified aircraft according to a first embodiment of the present invention.

As shown in FIG. 1, a propulsion drive system 110 of the electrified aircraft is configured such that a propeller 111 is driven by an electric drive motor 113, or the electric drive motor 113 generates electric power by rotating the propeller 111.

The electric drive motor 113 is driven by electric power supplied from an electric power source 115 such as a storage battery, or generates electric power to supply the electric power to the electric power source 115, and an inverter 114 controls the electric power.

Figure 2:
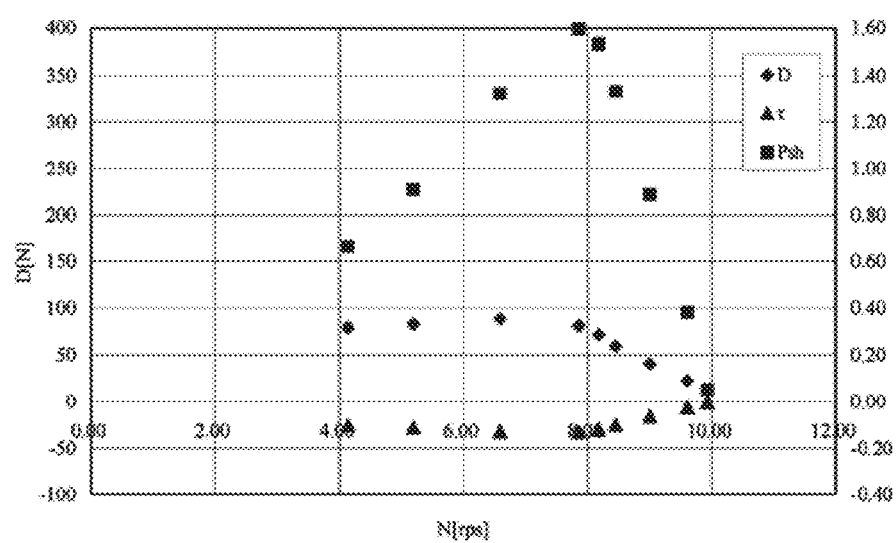
FIG. 2 A graph of a relationship between a rotation number and a drag force of a propeller.

A control unit, i.e., a drive control means 120, includes inside data groups relating to a relationship between a rotation number Ngen and a drag force Dp of a propeller specific to an individual electrified aircraft as shown in FIG. 2. At the time of generating an electric power, a drag operation unit 122 estimates the drag force of the propeller from torque of the electric drive motor 113 as propulsion system parameters of the electric drive motor calculated from a rotation number detected at a rotation number detection means 140 or a current detected at a current detection means 130 and from an airspeed detected at an airflow detection means 150 using the data groups. A thrust force control unit 123 sends a command value of the rotation number Ngen to the inverter 114.

It should be appreciated that the drive control means 120 may include functions approximate to the data groups instead thereof. The same applies to the following embodiments.

Here, a response and a control accuracy of the rotation number of the propeller 111 driven by the electric drive motor 113 are significantly higher than those of an internal combustion engine. U.S. Pat. No. 6,986,688 discloses this point in detail, the disclosure of which is totally incorporated herein by reference.

Figure 3:
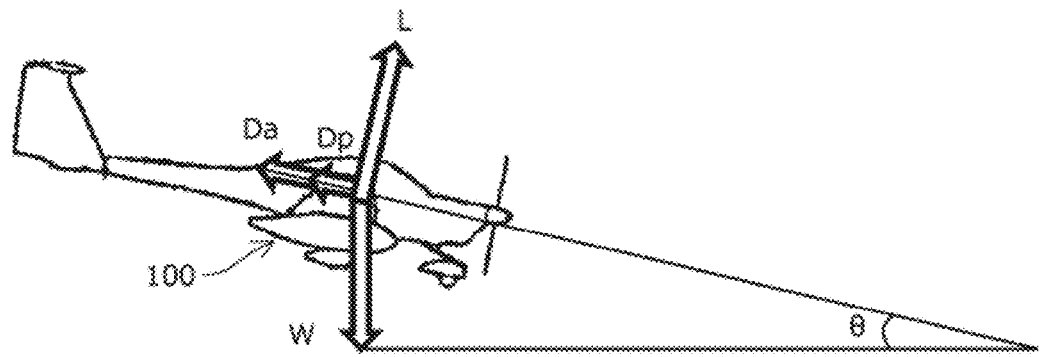
FIG. 3 An explanatory diagram of equilibrium of force in a travelling direction of an airframe of an aircraft.

Equilibrium of force in a travelling direction of an airframe of an aircraft is, as shown in FIG. 3, represented by $$W \times \sin\theta = Dp + Da \quad (1)$$

where
Da: drag force of airframe,
Dp: drag force of propeller,
W: weight of airframe, and
θ: path angle.

As the drag force Dp of the propeller increases, the path angle θ increases. Under steady flight status where the path angle θ is not large, a lift force of the airframe L (=½ρV2SCL) substantially equals to W and is constant.

The drag force Dp of the propeller does not affect a lift coefficient LC, i.e., an airspeed V, dissimilar to known aerodynamic devices.

When sin θ≈θ in the numerical formula (1), the drag force Dp of the propeller is linear to the path angle θ, has a good control property, and the airspeed V can be constant, thereby directly controlling the descending rate (=Vθ) in place of the path angle θ.

Note that a driving force operation unit 121 may estimate the torque from the current detected at the current detection means 130. At the time of propulsion, the drive control means 120 may send the command value of the torque from the thrust force control unit 123 to the inverter 114. At the time of generating electric power, the drive control means 120 may include the data groups relating to a relationship between the torque and the drag force Dp of the propeller, and may send the command value to the inverter 114.

The present invention is applicable not only to a propeller, but also to a fan. Here, the fan denotes a propulsion apparatus including a rotating rotor vane, a stator vane disposed downstream of the rotor vane, and a duct covering outer circumferences of them, for example.

Second Embodiment

Figure 4:
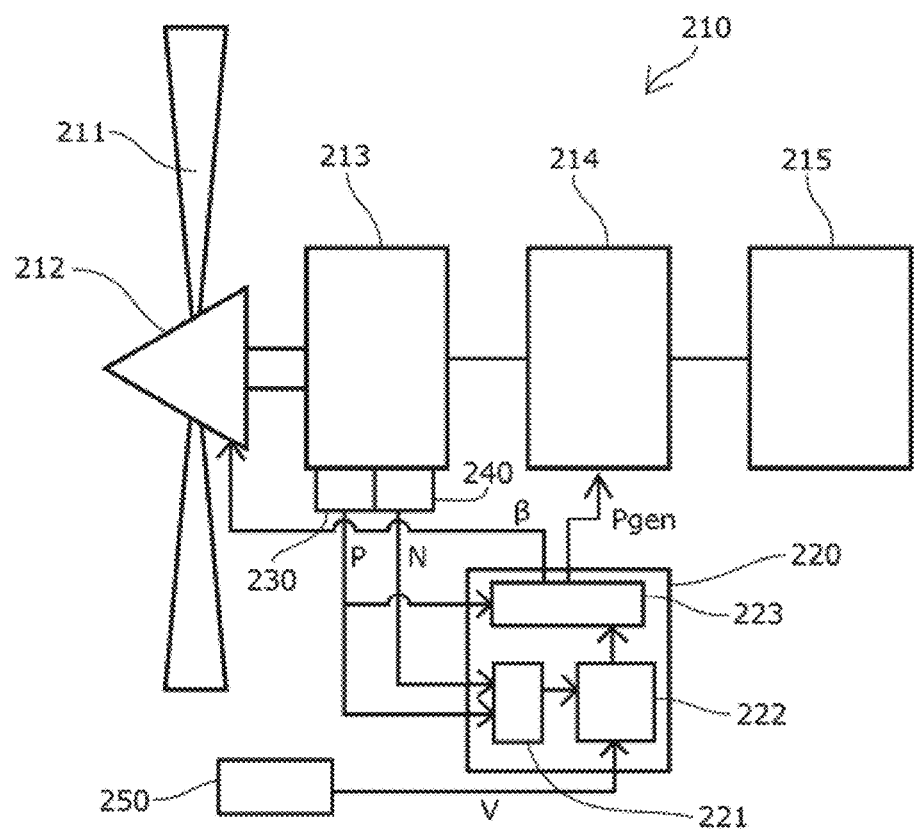
FIG. 4 An explanatory diagram of a propulsion drive system of an electrified aircraft according to a second embodiment.

FIG. 4 is an explanatory diagram of a propulsion drive system of an electrified aircraft according to a second embodiment of the present invention.

As shown in FIG. 4, a propulsion drive system 210 of the electrified aircraft is configured such that a propeller 211 is driven by an electric drive motor 213, or the electric drive motor 213 generates electric power by rotating the propeller 211 similar to the first embodiment.

The electric drive motor 213 is driven by electric power supplied from an electric power source 215 such as a storage battery, or generates electric power to supply the electric power to the electric power source 215, and an inverter 214 controls the electric power.

In this embodiment, the propeller 211 is a variable pitch propeller including a variable pitch mechanism 212, and the variable pitch mechanism 212 has a function to change a pitch angle β from a pitch angle βTO used at a take-off to a pitch angle β0 that is smaller than the pitch angle βTO.

The variable pitch mechanism is a mechanism for controlling β by rotating a pitch axis of a propeller blade using a driving source such as an oil-hydraulic mechanism or an electric motor included inside of a propeller spinner.

At the time of generating an electric power, the drive control means 220 sends the electric power generation Pgen from the thrust force control unit 223 to the inverter 214, and a target value signal of the pitch angle β to the variable pitch mechanism 212.

Figure 5:
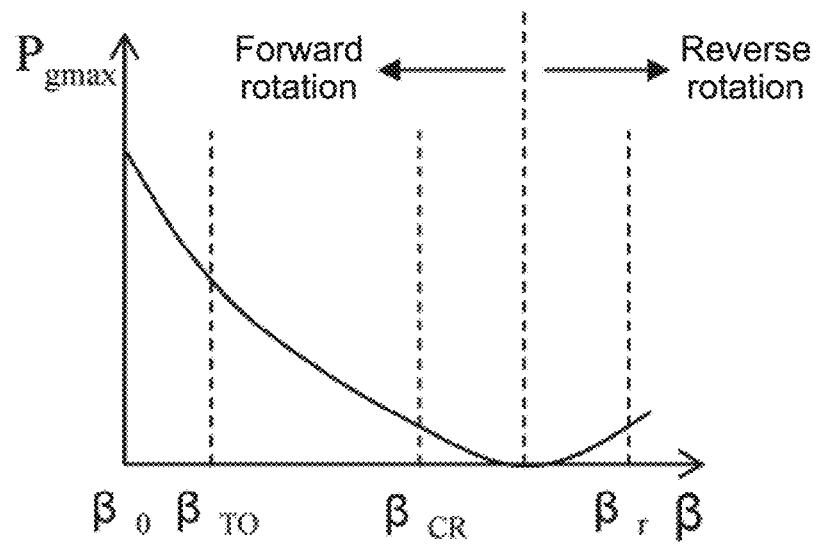
FIG. 5 A graph of a relationship between a pitch angle and generated electric power.

When an electric power is generated using the propeller 211, a maximum value of electric power generation Pgmax at a certain pitch angle β in the electric power generation Pgen can be increased like a windmill when rotation of the propeller 211 is forward (rotated forward) in a direction in which the thrust force is produced by the propeller 211 by decreasing the pitch angle β as compared to when rotation of the propeller 211 is reversed (rotated reverse) by increasing the pitch angle β opposite to the status that the thrust force is produced by the propeller 211, as shown in FIG. 5.

Figure 6:
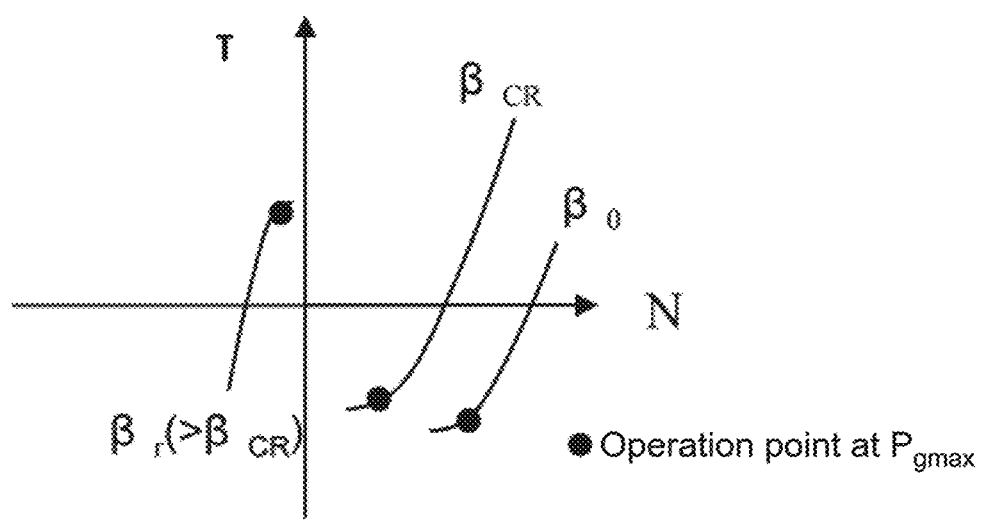
FIG. 6 A graph of a relationship among a pitch angle, torque, a rotation number and generated electric power.

Accordingly, when the propeller 211 is switched from propulsion to electric power generation, the drive control means 220 issues a command for decreasing the target value of the pitch angle β to the variable pitch mechanism 212, thereby keeping the maximum value of the electric power generation Pgmax without changing the rotation direction, using properties shown in FIG. 6.

In particular, the electric power generation can be greater by changing the pitch angle β from the pitch angle βTO used at a take-off to the pitch angle β0 that is smaller than the pitch angle βTO.

At the time of propulsion, the command value corresponding to the rotation number or the torque is sent from the thrust force control unit 223 of the drive control means 220 to the inverter 214, and the target value of the pitch angle is sent to the variable pitch mechanism 212.

Third Embodiment

Figure 7:
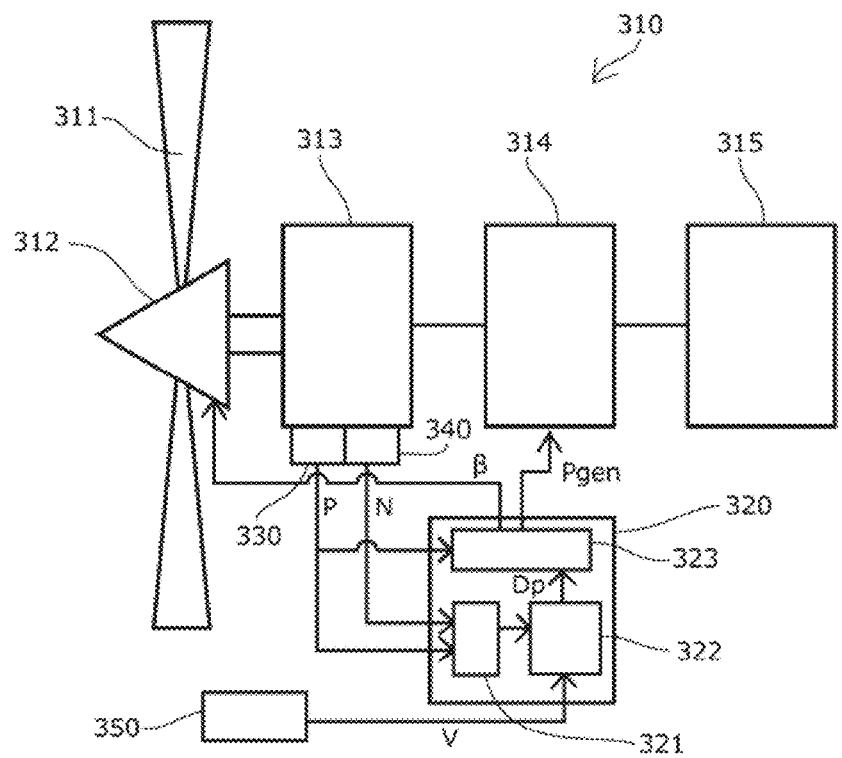
FIG. 7 An explanatory diagram of a propulsion drive system of an electrified aircraft according to a third embodiment.

FIG. 7 is an explanatory diagram of a propulsion drive system of an electrified aircraft according to a third embodiment of the present invention.

As shown in FIG. 7, a propulsion drive system 310 of the electrified aircraft is configured such that a propeller 311 is driven by an electric drive motor 313, or the electric drive motor 313 generates electric power by rotating the propeller 311 similar to the second embodiment.

The electric drive motor 313 is driven by electric power supplied from an electric power source 315 such as a storage battery, or generates electric power to supply the electric power to the electric power source 315, and an inverter 314 controls the electric power.

The propeller 311 is a variable pitch propeller including a variable pitch mechanism 312, and the variable pitch mechanism 312 has a function to change the pitch angle β from the pitch angle βTO used at a take-off to the pitch angle β0 that is smaller than the pitch angle βTO.

Figure 8:
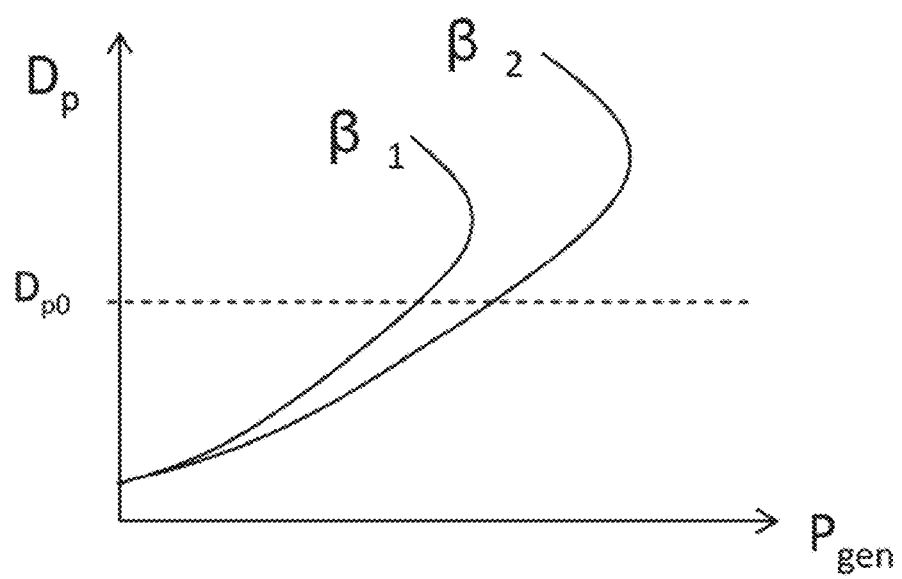
FIG. 8 A graph of a relationship among generated electric power, a propeller drag force and a pitch angle.

In this embodiment, a drive control means 320 includes inside data groups relating to a relationship among an airspeed V, electric power generation Pgen, a drag force Dp of a propeller, and a pitch angle β specific to an individual electrified aircraft as shown in FIG. 8. At the time of generating an electric power, a drag operation unit 322 estimates the drag force of the propeller from torque of the electric drive motor 313 calculated from a rotation number detected at a rotation number detection means 340 or a current detected at a current detection means 330 and from an airspeed detected at an airflow detection means 350 using the data groups. A thrust force control unit 323 sends the electric power generation Pgen to the inverter 214 and a target value signal of the pitch angle β to the variable pitch mechanism 312 depending on a designated value of the drag force of the propeller.

At the time when the pitch angle β=β1, and the drag force Dp of the propeller=Dp0, the drive control means 320 changes the pitch angle from β1→β2 while keeping the drag force Dp of the propeller, and maximizes the electric power generation Pgen against the airspeed V and the drag force Dp0 at that time.

At the time of propulsion, the drive control means 320 sends the command value corresponding to the rotation number or the torque from the thrust force control unit 323 to the inverter 314, and sends a target value of the pitch angle to the variable pitch mechanism 312.

Fourth Embodiment

Figure 9:
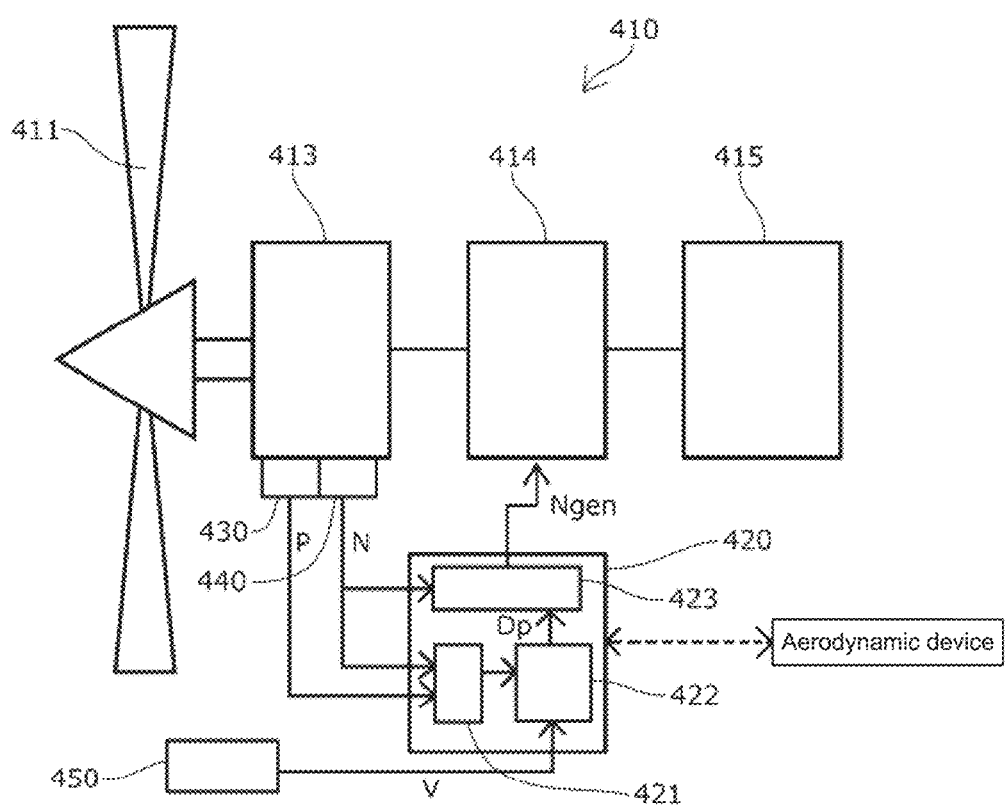
FIG. 9 An explanatory diagram of a propulsion drive system of an electrified aircraft according to a fourth embodiment.

FIG. 9 is an explanatory diagram of a propulsion drive system of an electrified aircraft according to a fourth embodiment of the present invention.

As shown in FIG. 9, a propulsion drive system 410 of the electrified aircraft according to the fourth embodiment is configured such that a propeller 411 is driven by an electric drive motor 413, or the electric drive motor 413 generates electric power by rotating the propeller 411 similar to the first embodiment.

The electric drive motor 413 is driven by electric power supplied from an electric power source 415 such as a storage battery, or generates electric power to supply the electric power to the electric power source 415, and an inverter 414 controls the electric power.

According to this embodiment, a drive control means 420 includes inside data groups relating to a relationship between a rotation number Ngen and a drag force Dp of a propeller specific to an individual electrified aircraft as shown in FIG. 2 described above, and data groups relating to the airspeed V and a lift-drag ratio L/D. At the time of generating an electric power, a drag operation unit 422 estimates the drag force of the propeller from torque of the electric drive motor 413 calculated from a rotation number detected at a rotation number detection means 440 or a current detected at a current detection means 430 and from an airspeed detected at an airflow detection means 450 using the data groups. A thrust force control unit 423 sends a command value of the rotation number Ngen to the inverter 114.

Equilibrium of force in a travelling direction of an airframe of an aircraft is, as shown in FIG. 3 described above, represented by $$\theta = 1/(L/D) + Da/W \text{ (when } \theta \text{ is small)}$$

where
Da: drag force of airframe,
Dp: drag force of propeller,
W: weight of airframe, and
θ: path angle.

Accordingly, when the airspeed V is controlled by changing the lift-drag ratio L/D using an existing aerodynamic device such as a spoiler and an elevator, the drive control means 420 can control the drag force Dp of the propeller, and correct the path angle θ to a desired value.

By changing the existing aerodynamic device by the drive control means 420 and controlling the drag force Dp of the propeller, it becomes possible to optimize an electric power and to control an elevator ratio or the path angle and the airspeed independently.

At the time of propulsion, the drive control means 420 sends the command value corresponding to the rotation number or the torque from the thrust force control unit 420 to the inverter 414.

As described above, according to the present invention, it is possible to independently control the elevator ratio or the path angle and the airspeed as well as to regenerate by the electric power generation, taking advantage of high responsiveness of the propulsion drive system of the electrified aircraft.

Furthermore, the aforementioned third embodiment (including controlling the variable pitch mechanism) is combined with the fourth embodiment (including controlling the existing aerodynamic device), thereby providing a high precision and an efficiency.

Note that the current detection means, the rotation number detection means and the airflow detection means are not limited to those shown in the drawings in the above-mentioned embodiments, and may be any means for detecting a current, a rotation number and an airflow functionally and may detect by calculating from other parameters.

Fifth Embodiment

Figure 10:
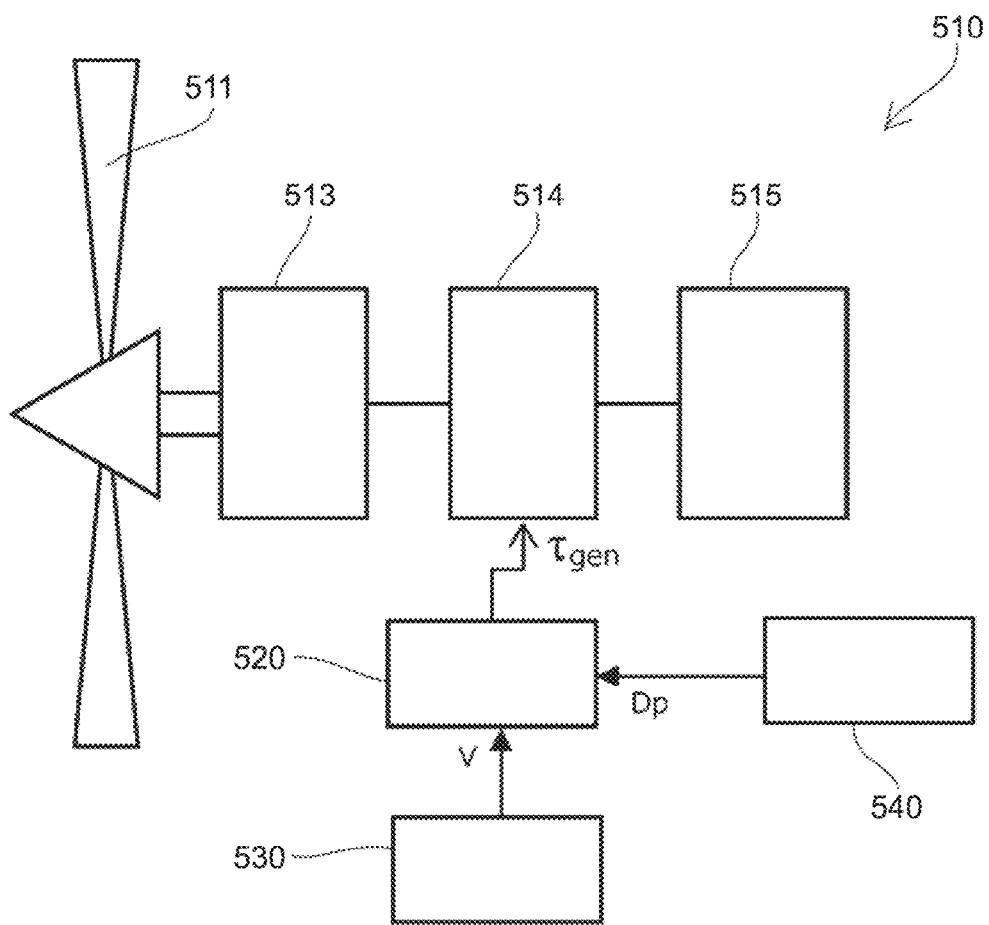
FIG. 10 An explanatory diagram of an operation system of an electrified aircraft according to a fifth embodiment.

FIG. 10 is an explanatory diagram of an operation system of an electrified aircraft according to a fifth embodiment of the present invention.

As shown in FIG. 10, an operation system 510 of the electrified aircraft is configured such that a propeller 511 is driven by an electric drive motor 513, or the electric drive motor 513 generates electric power by rotating the propeller 511.

The electric drive motor 513 is driven by electric power supplied from an electric power source 515 such as a storage battery, or generates electric power to supply the electric power to the electric power source 515, and an inverter 514 controls the electric power.

Figure 12:
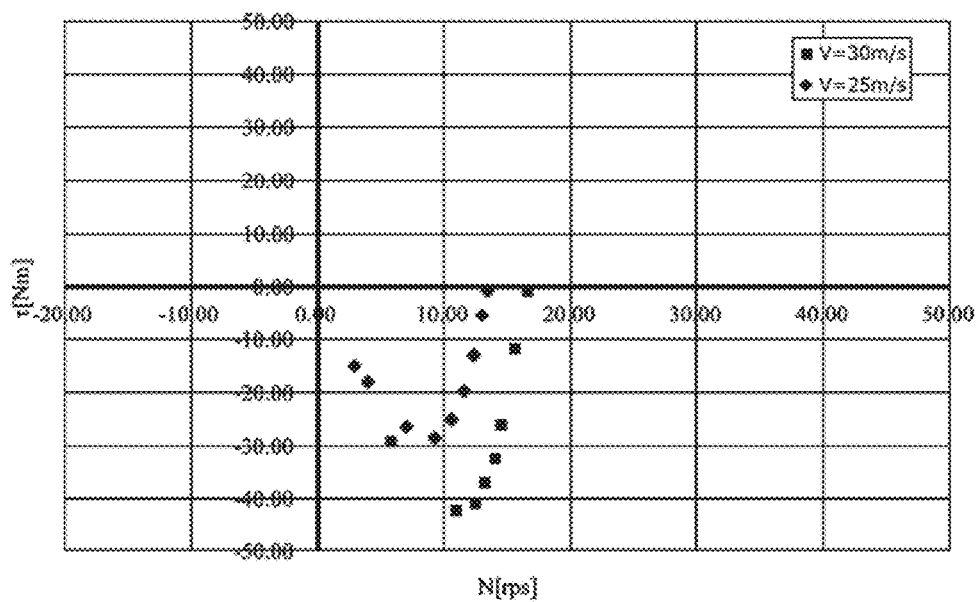
FIG. 12 A graph of a relationship among an airspeed, a rotation number and torque.

The drive control means 520 includes inside data groups relating to a relationship among the airspeed V, the rotation number N of the propeller and torque τ (the drag force of the propeller) specific to an individual electrified aircraft as shown in FIG. 12. The drive control means 520 uses the airspeed V provided from a current detection means 530, calculates a torque command value τgen corresponding to a drag command value Dp designated by the operation position detection sensor 541 of the operation means 540 as an operation unit, and inputs the value to the inverter 514.

Figure 11:
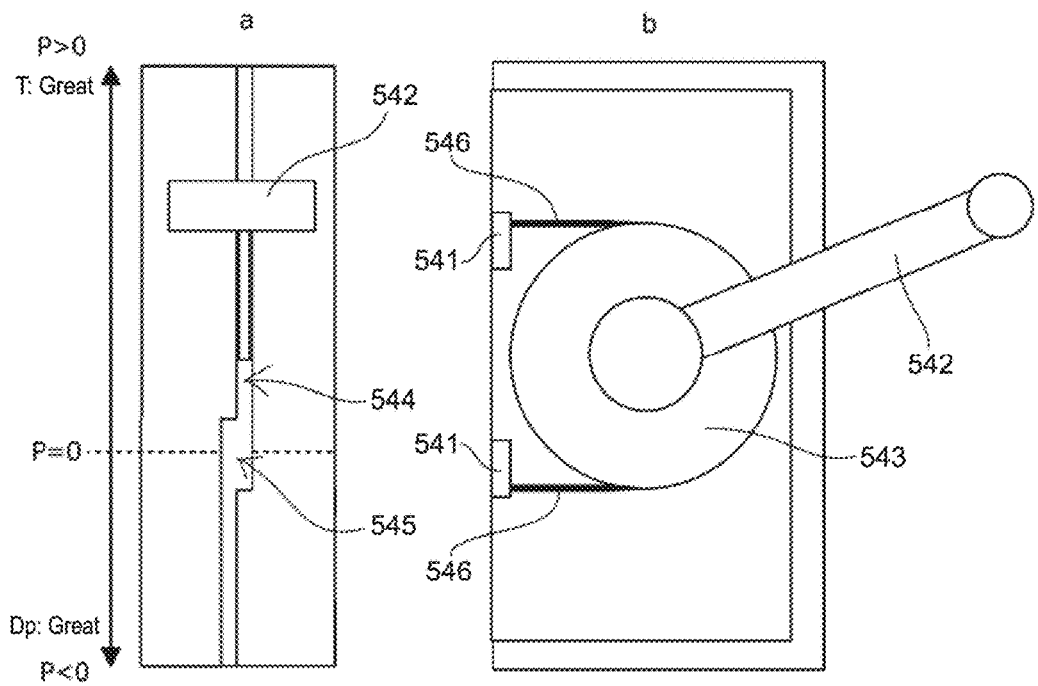
FIG. 11 A schematic diagram of an operation means.

The operation means 540 include a lever 542 that is the operation member guided by a lever slit 544 and oscillatably supported back and forth, and two operation position detection sensors 541 for detecting an oscillating position of the lever 542, as shown in FIG. 11.

The two operation position detection sensors 541 are to detect a displacement of a wire 546 hitched around a pulley 543 that is integrally rotated with the lever 542, and are positioned to detect inversely positive and negative.

The drag force Dp of the propeller is specified by an increasing function of a sensor output difference between the two operation position detection sensors 541.

The operation means 540 has a failure detection mechanism, monitors a sum of sensor outputs and, if it exceeds a certain value, determines that any of the sensors is failed.

An operator, e.g., a pilot, operates the lever 542 back and forth to increase or decrease a thrust force T or a drag force Dp of the propeller.

A stopper 545 is placed in the lever slit 544 at a predetermined position that guides a back and forth operation of the lever 542.

At the predetermined position, a motor output P is set to equal to 0 (neutral position). When it transits from the position to an electric power generation status of P<0, the lever 542 is stopped once at the stopper 545. Other operation such as moving the lever 542 laterally is necessary in order to pass through the stopper 545.

This allows an unintentional transition by a wrong operation by an operator to an electric power generation status to be prevented.

Sixth Embodiment

Figure 13:
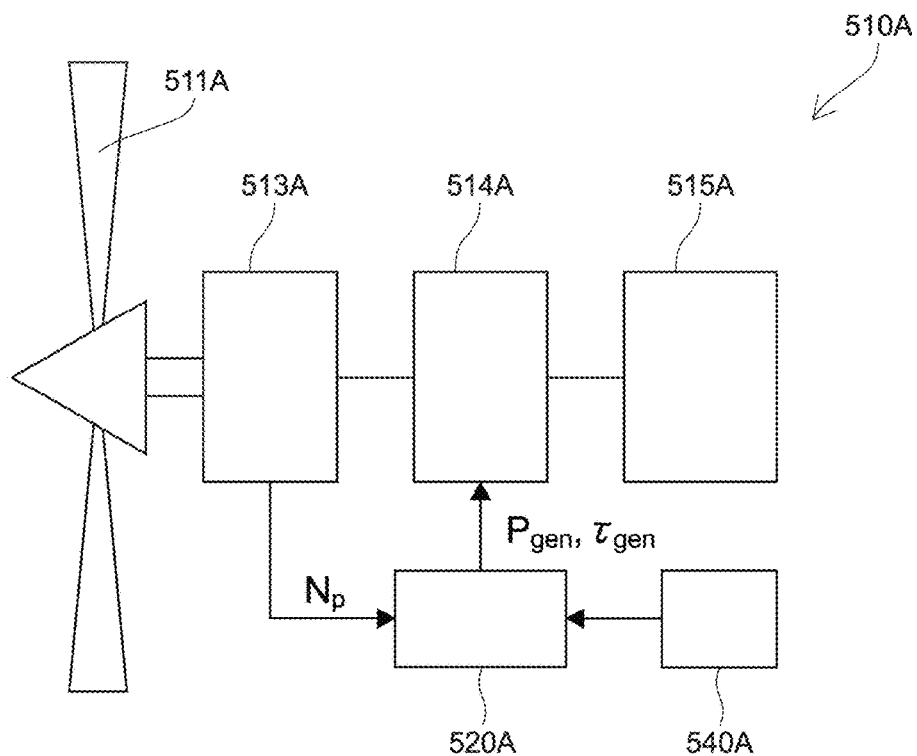
FIG. 13 An explanatory diagram of an operation system of an electrified aircraft according to a sixth embodiment of the present invention.

FIG. 13 is an explanatory diagram of an operation system of an electrified aircraft according to a sixth embodiment of the present invention.

As shown in FIG. 13, an electrified aircraft 510A is an aircraft propelled by a propeller 511A, and the propeller 511A is driven by an electric drive motor 513A controlled by an inverter 514A.

At the time of regeneration, the inverter 514A controls the regenerative electric power Pgen or regeneration torque $\tau_{gen}$ so as to match with a target value generated at a drive control means 520A depending on an operation amount of an operation device 540A.

At a certain airspeed U, when electric power Pgen regenerated by the propeller becomes a maximum value $P_{max}$, an advance ratio J is defined by the following numerical formula:

$$J = U/N_P d_P = J_{pmax}$$

where
J: advance ratio
U: airspeed
$N_p$: rotation number of propeller, and
$d_P$: diameter of propeller.

Figure 14:
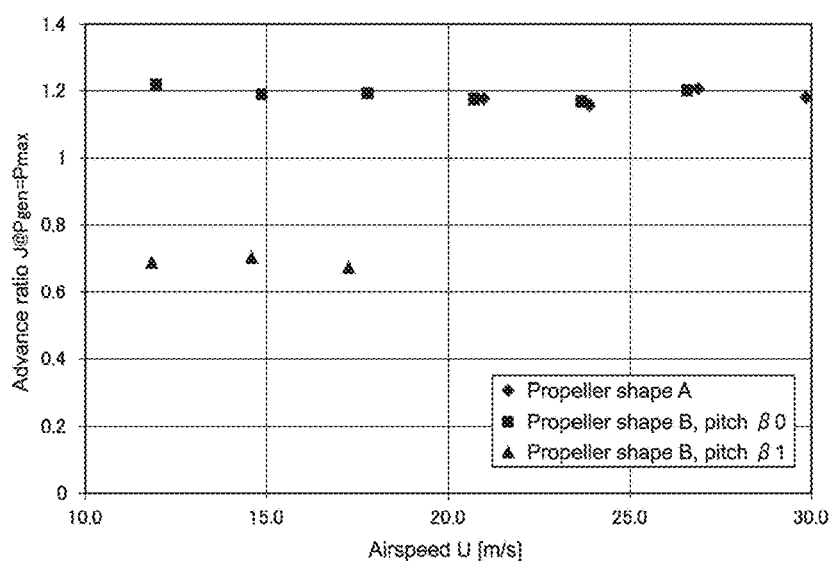
FIG. 14 A graph showing a relationship between an airspeed and an advance ratio.

The advance ratio J is a constant value $J_{Pmax}$ not depending on the airspeed U, but depending on a shape of the propeller and the pitch angle, as shown in FIG. 14.

A power coefficient $C_P$ that is a function of the advance ratio J is defined by the following numerical formula.

$$C_{pmax} = P_{max}/\rho N_P^3 d_P^5 = 2\pi\tau_{Pmax}/\rho N_P^2 d_P^5$$

As the advance ratio J is constant, the power coefficient $C_P$ also becomes a constant value ($C_{pmax}$) not depending on the airspeed U. At this time, the regenerative torque $\tau_{Pmax}$ is represented by:

$$\tau_{Pmax} = 2\pi C_{pmax} \rho N_P^2 d_P^5.$$

The regenerative torque $\tau_{Pmax}$ is proportional to square of the rotation number $N_P$ of the propeller. As a result, the maximum value of electric power generation Pgmax regenerated by the propeller is proportional to cube of $N_P$.

Accordingly, the target value of the regenerative torque $\tau_{gen}$ from the drive control means 520A is set to be proportional or slightly smaller than $\tau_{Pmax}$ in the above numerical formula being $\tau_{Pmax}$ as an upper limit, depending on the operation amount of an operation device 540A, for example. Thus, if the airspeed U changed momentarily is not detected, the regenerative torque $\tau_{gen}$ becomes out of the regenerative range. In this manner, a control range of the electric power Pgen regenerated by the propeller and the drag force Dp of the propeller can be maximized without being the rotation of the propeller unstable.

As described above, the regenerative electric power is different depending on the airspeed (dynamic pressure). So, when the airspeed is changed, the regenerative electric power becomes insufficient or the propeller becomes unstable. Accordingly, it is generally conceivable that an airspeed detection means is necessary. However, according to the fifth embodiment, a generated electric power of the electric drive motor 513A is proportional to cube of the rotation number of the motor, or motor torque at the time of generating an electric power is proportional to square of the rotation number of the motor, thereby maximizing the regenerative electric power without detecting the airspeed (dynamic pressure). Namely, according to the fifth embodiment, the regenerative torque is matched and adjusted with the rotation number at that time such that the advance ratio is taken to have the maximum regenerative electric power. As a result, the regenerative electric power is maximized not depending on the airspeed, and a controllable range of the drag force of the propeller can be widen.

Seventh Embodiment

Figure 15:
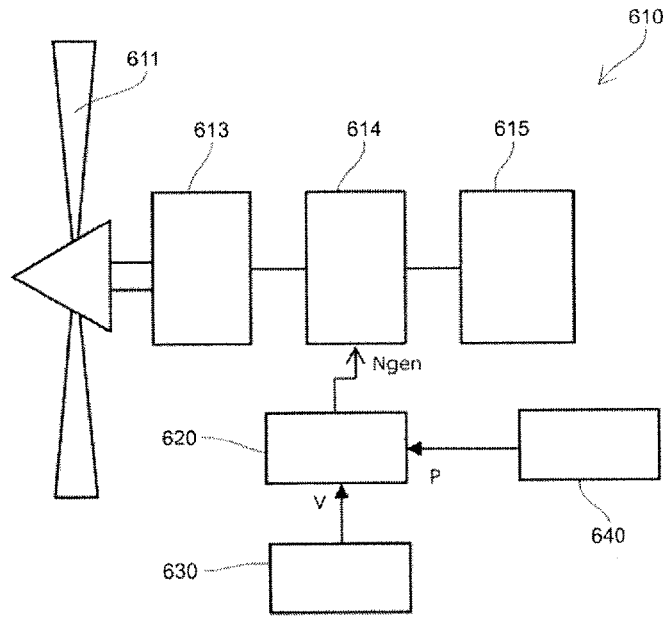
FIG. 15 An explanatory diagram of an operation system of an electrified aircraft according to a seventh embodiment.

FIG. 15 is an explanatory diagram of an operation system of an electrified aircraft according to a seventh embodiment of the present invention.

As shown in FIG. 15, a propulsion drive system 610 of the electrified aircraft is configured such that a propeller 611 is driven by an electric drive motor 613, or the electric drive motor 613 generates electric power by rotating the propeller 611, similar to the first embodiment.

The electric drive motor 613 is driven by electric power supplied from an electric power source 615 such as a storage battery, or generates electric power to supply the electric power to the electric power source 615, and an inverter 614 controls the electric power.

The operation means 640 is similar to that shown in FIG. 11 above, and is not shown and described.

Figure 16:
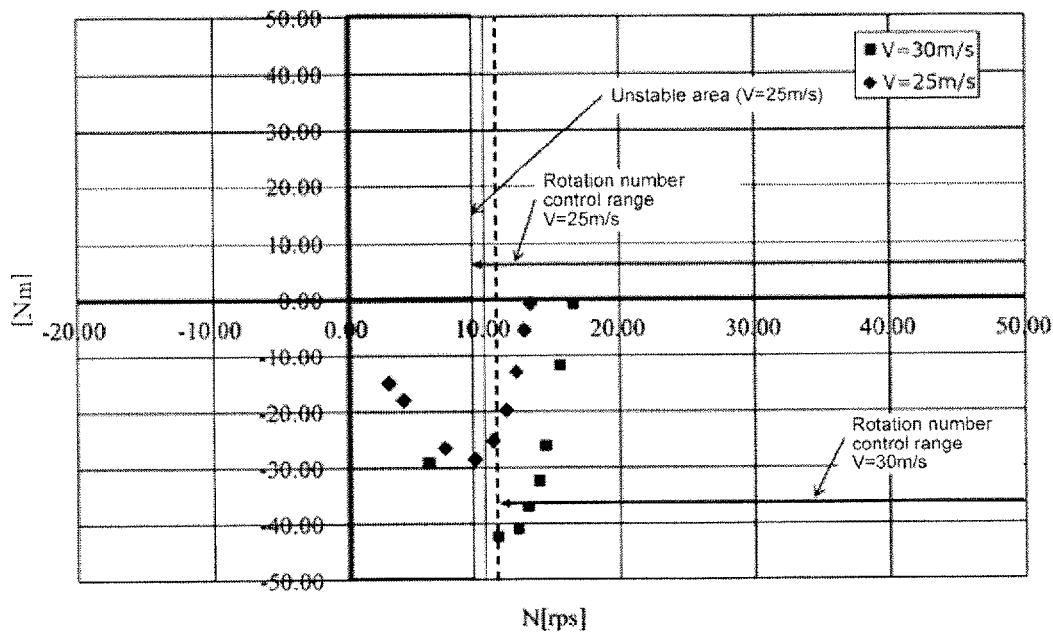
FIG. 16 A graph of a relationship among an airspeed, a rotation number and torque.

A drive control means 620 includes inside data groups relating to a relationship among the airspeed V, the rotation number of the propeller N and the motor output P specific to an individual electrified aircraft as shown in FIG. 16. The drive control means 620 uses the airspeed V provided from a current detection means 630, calculates a rotation number designated value Ngen corresponding to an output designated value Pgen designated by the operation position detection sensor 541 of the operation means 640, and inputs the value to the inverter 614.

For example, at the airspeed V=25 m/s, the torque τ of the propeller 611 takes a minimum value around the rotation number N=9 rps. When the rotation number designated Ngen is lower than the minimum value and the inverter 614 controls the torque control, the electric drive motor 613 cannot keep the rotation number Ngen, and the propeller 611 stops at the worst.

In addition, in order to make the propeller 611 to effectively generate an electric power, it is desirable to keep the rotation number within a rotation number control range shown by an arrow in FIG. 16. There are less benefits that the propeller is operated at an unstable area shown in FIG. 16.

Correspondingly, when the drive control means 620 calculates the control range of the rotation number N corresponding to the value of the airspeed V, and changes a setting range of the output designation range to a range of the motor output P, it can prevent the propeller 611 from operating at the unstable area.

As described above, according to the present invention, it is possible to independently control the elevator ratio or the path angle and the airspeed, taking advantage of high responsiveness of the propulsion drive system of the electrified aircraft. It is also possible to operate the drag force of the propulsion drive system and to independently and responsively control the path angle and the descending rate. Furthermore, by operating an operation means, it is possible to control the generated electric power to the target at the time of descent or ascent.

The current detection means, the rotation number detection means, the airflow detection means may be any of those that can functionally detect a current, a rotation number and an airflow, or may detect by calculating from other parameters.

Eighth Embodiment

Figure 17:
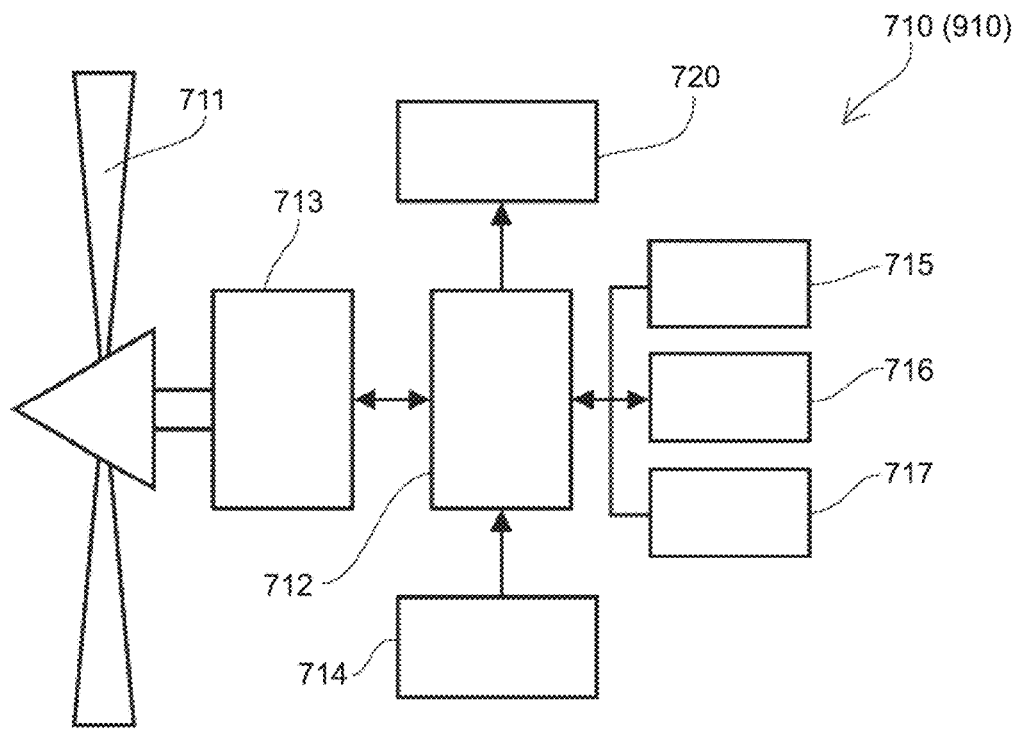
FIG. 17 An explanatory diagram of a display system of an electrified aircraft according to an eighth embodiment (tenth embodiment).

FIG. 17 is an explanatory diagram of a display system of an electrified aircraft according to an eighth embodiment of the present invention.

As shown in FIG. 17, a display system 710 of the electrified aircraft is driven by an electric drive motor 713, or the electric drive motor 713 generates electric power by rotating the propeller 111.

The electric drive motor 713 is controlled by a drive control means 712, is driven by electric power supplied from an electric power source 716 such as a storage battery, or generates electric power to supply the electric power to the electric power source 716.

The drive control means 712 supplies electric power corresponding to an input of an operation means 714 from the electric power source 716 to the electric drive motor 713, estimate torque τ from a motor current I, and calculates a motor output P from a rotation number N provided separately at a current operational point.

Figure 18:
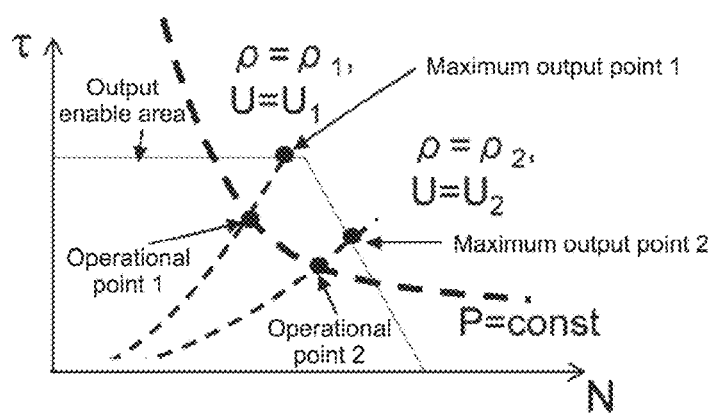
FIG. 18 An explanatory graph of data groups relating to a motor output enable area of the electrified aircraft.

Also, the drive control means 712 estimates a motor output $P_{max}$ at a maximum output point, at an airspeed U and an air density p from information of the airspeed U and the air density ρ provided from an airflow detection means 715, a data group relating to the rotation number N and the torque τ provided in advance, and a data group relating to a motor output enable area shown in FIG. 18.

Figure 19:
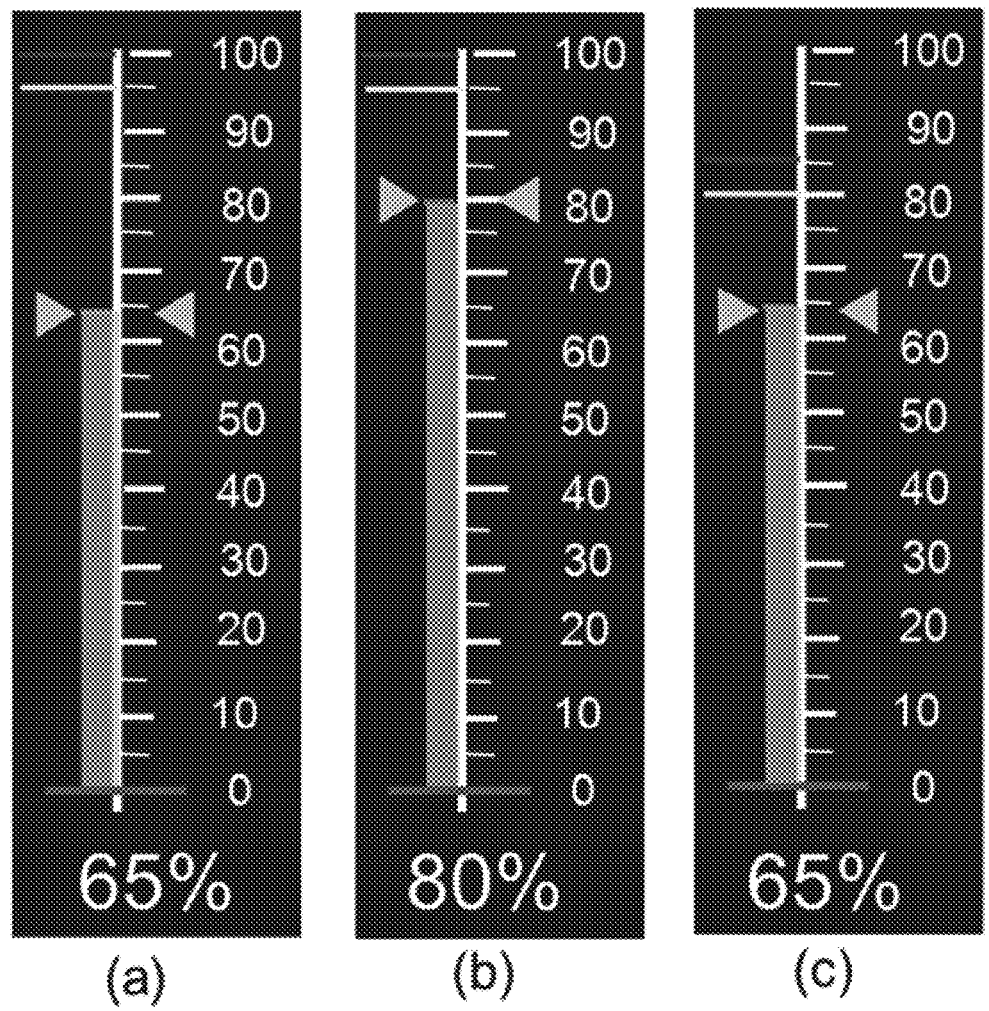
FIG. 19 A reference diagram of an illustrative display of a motor output.

An information display means 720 as a display unit displays not only the present motor output P, but also percentages of the motor output P to the maximum value $P_{max}$ as shown in FIGS. 19(a), 19(b). It is possible to notify intuitively a pilot of an output margin at a present flying status, which allows an efficient and safe flying.

Figure 20:
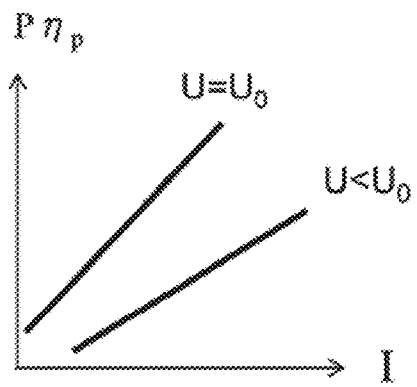
FIG. 20 A graph showing a relationship between an available horse power and a current.
Figure 21:
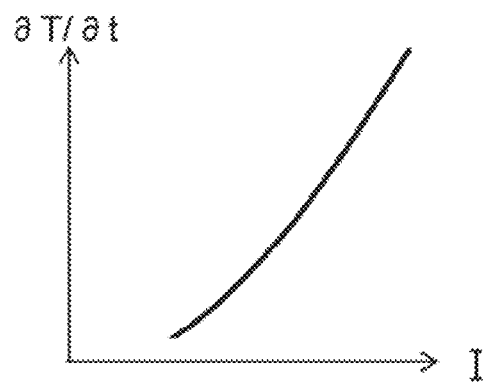
FIG. 21 A graph showing a relationship between a temperature increase rate and a current.

A climb rate of the aircraft increases linearly to an available horse power Pηp. As shown in FIG. 20, this is an increasing function of a current I. At the same time, as shown in FIG. 21, a temperature increase rate ∂T/∂t of the electric drive motor 713, the electric power source 716 or the like greatly changes by the current I.

Therefore, in order to keep a temperature T of the propulsion system within an adequate range, notifying the pilot of an allowable range or a range of a sustainable value for a certain period of time of the current I or the motor output P depending on the temperature T changed momentarily is very important for perceiving a safety margin.

However, an aircraft has to climb promptly to a certain altitude Hth after take-off in order to ensure provide safety of the airframe. At this time, the propulsion system has to maintain the maximum output not depending on the temperature T.

When an airframe height H is H>Hth from information about an airframe height H provided from an airframe height detection means 717, it switches the status shown in FIG. 19(a) to the status shown in FIG. 19(c) where the range of a sustainable value of the motor output P or the current I is changed depending on the temperature T. In this manner, a safety margin of a propulsion system output becomes clear for a pilot under any flight status, and a defect of unintentional excess temperature can be prevented.

Ninth Embodiment

Figure 22:
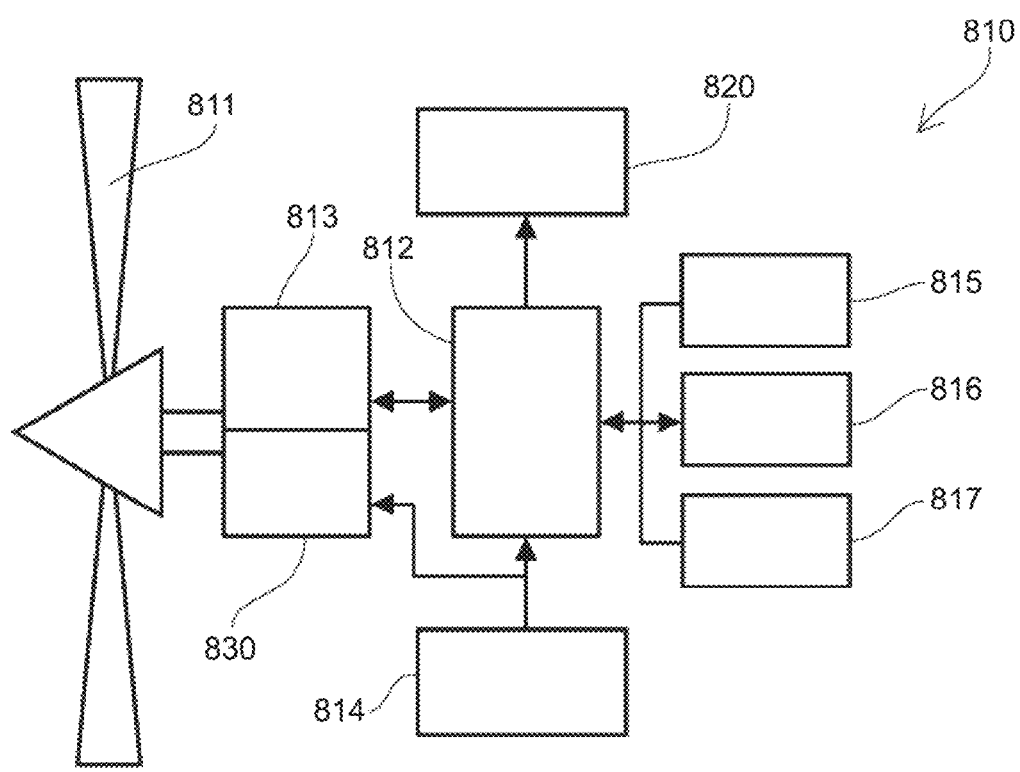
FIG. 22 An explanatory diagram of a display system of an electrified aircraft according to a ninth embodiment.

FIG. 22 is an explanatory diagram of a display system of an electrified aircraft according to a ninth embodiment of the present invention.

As shown in FIG. 22, a display system 810 of the electrified aircraft is for a hybrid type aircraft having an electric drive motor 813 and an internal combustion system 830. A propeller 811 is driven by the electric drive motor 813 or the internal combustion system 830. The electric drive motor 813 generates electric power by rotating the propeller 811.

The internal combustion system 830 is controlled by an operation means 814. The electric drive motor 813 is controlled by a drive control means 812, is driven by electric power supplied from an electric power source 816 such as a storage battery, or generates electric power to supply the electric power to the electric power source 816.

When an electric power is generated using the propeller 811, the drive control means 812 supplies electric power corresponding to an input of the operation means 814 from the electric drive motor 813 to the electric power source 816, estimate torque τ from a motor current I, and calculates a motor output P from a rotation number N provided separately at a present operational point.

Figure 23:
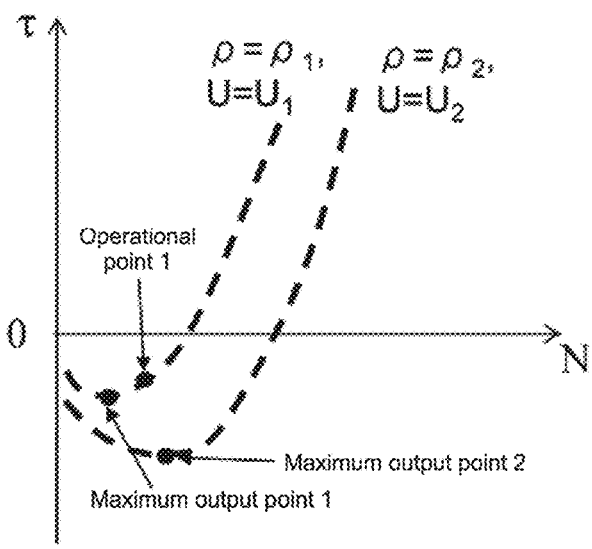
FIG. 23 An explanatory graph of data groups relating to an energy regenerative property.

Also, the drive control means 812 estimates a maximum regenerative output (electric power) $P_{max}$ at an airspeed U and an air density p from information of the airspeed U and the air density ρ provided from an airflow detection means 815, a data group relating to the rotation number N and the torque τ provided in advance, and a data group relating to an energy regenerative property of the propeller 811 shown in FIG. 23.

Figure 24:
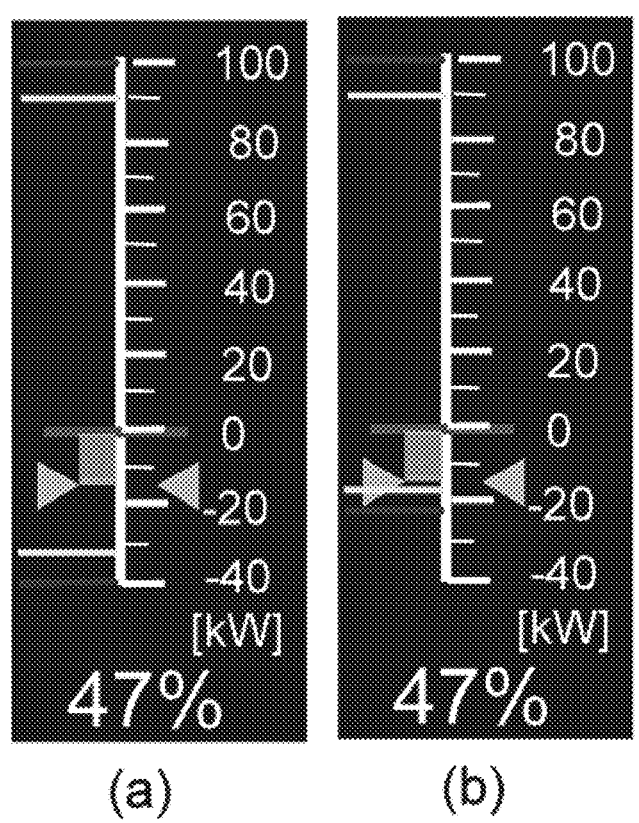
FIG. 24 A reference diagram of illustrative displays of a motor output and a regenerative electric power.

An information display means 820 displays not only the present motor output P, but also percentages of the motor output P to the maximum value $P_{max}$ as shown in FIG. 24(a). It is possible to notify intuitively a pilot of an output margin at a present flying status, which effectively alleviates flight and workloads.

Figure 25:
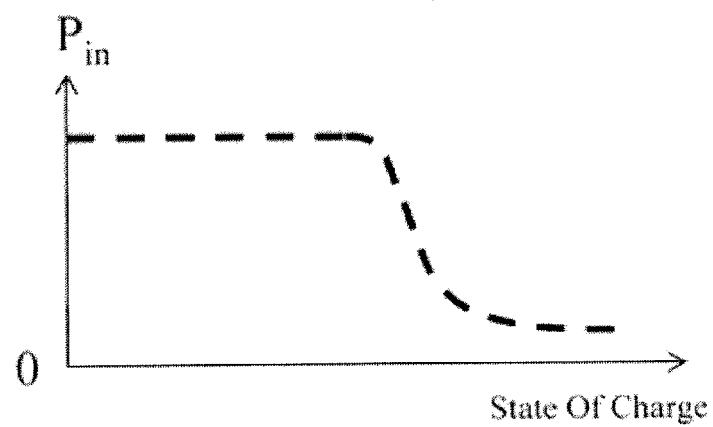
FIG. 25 A graph showing a relationship between charging energy and an SOC.
Figure 26:
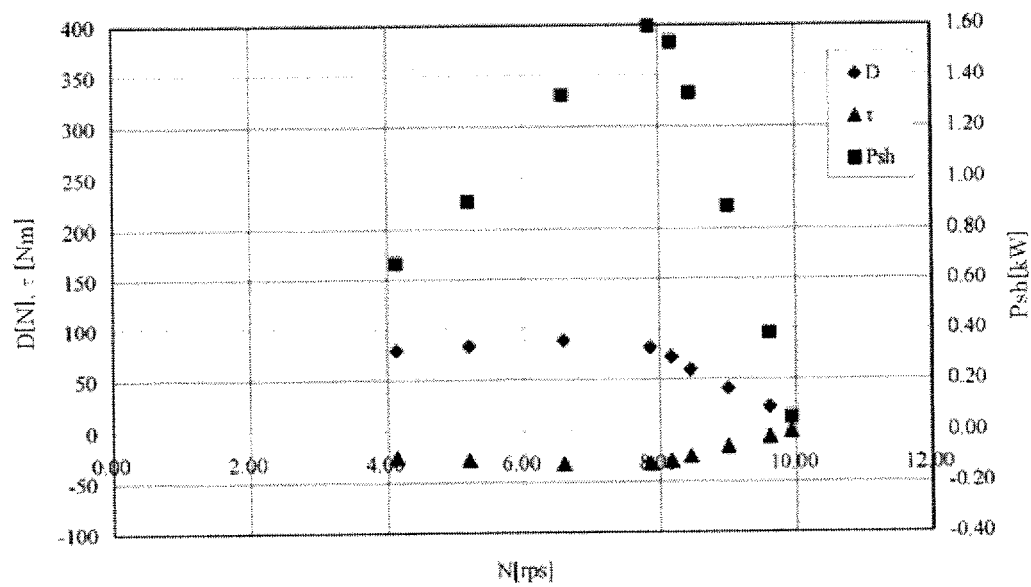
FIG. 26 A graph among an airspeed, a rotation number and torque.

In general, when the electric power regenerated by using the propeller 811 and the electric drive motor 813 is charged to the electric power source 816 with a high Status Of Charge (SOC) of the electric power source 816, it is necessary to decrease charging energy $P_{in}$ for safety reasons to avoid overcharge, as shown in FIG. 25 as compared with the low SOC. The pilot cannot easily perceive an allowable range of the charging energy $P_{in}$ only by monitoring the SOC, and there is a risk to generate unintentional overcharge by an inadvertent operation.

In order to avoid the situation, according to the present invention, the drive control means 812 monitors the SOC of the electric power source 816 from a voltage and an amount of a current, the allowable range of the charging energy $P_{in}$ is clearly shown by color such as red or yellow as shown in FIG. 24(b) (although it is represented by a gray scale because of the drawing limitation), and the display is changed by the value of the SOC changed momentarily. Under any flight status, it is possible to notify intuitively a pilot of an output margin of a regenerative electric power at any flying status, which prevents the risk.

Tenth Embodiment

A display system of an electrified aircraft according to a tenth embodiment is similar to the eighth embodiment shown in FIG. 17.

In a display system 910 of the electrified aircraft, as shown in FIG. 17, similar to the eighth embodiment, the propeller 711 is driven by the electric drive motor 713, or the electric drive motor 713 generates electric power by rotating the propeller 111.

When an electric power is generated using the propeller 711, the electric drive motor 713 is controlled by the drive control means 712, is driven by electric power supplied from the electric power source 716 such as a storage battery, or generates electric power to supply the electric power to the electric power source 716.

The drive control means 712 supplies electric power corresponding to an input of an operation means 714 from the electric power source 716 to the electric drive motor 713, estimate torque τ from a motor current I, and calculates a motor output P from a rotation number N provided separately at a present operational point.

Also, the drive control means 712 includes information of the airspeed U and the air density ρ provided from the airflow detection means 715, a data group relating to the rotation number N and the torque τ provided in advance, and a data group relating to the rotation number N and the drag force Dp, and sends the rotation number N or the command value of the torque τ to the electric drive motor 713 at the time of generating an electric power to calculate the drag force Dp.

As shown in FIG. 3, equilibrium of force in a travelling direction of an airframe of an aircraft when energy is regenerated at the time of descending an aircraft 100 is represented by $$W \sin \theta = Dp + Da$$

where
Da: drag force of airframe,
W: weight of airframe, and
θ: path angle.

As the drag force Dp of the propeller increases, the path angle θ increases. Under steady flight status where the path angle θ is not extremely large, the drag force Dp of the propeller does not affect a lift force L, i.e., the airspeed V.

From the following numerical formula (1), the drag force Dp is linear to the path angle θ. By calculating the drag force Dp, the path angle θ can be promptly estimated.

$$L = \frac{1}{2}\rho V^2 S C_L = W \cos \theta \approx W \quad \text{[Numerical Formula 1]}$$
$$D_a + D_p = W \sin \theta \approx W \theta = L \theta$$
$$\theta = \frac{D_a}{L} + \frac{D_p}{W} = \frac{1}{L/D} + \frac{D_p}{W}$$

Based on the path angle θ estimated, the descending rate Vθ is displayed and the pilot is fed back with a good response, thereby controlling the airframe safely.

When an aircraft is landed and descended, it is generally requested that the descending rate Vθ keeps a certain value or less for safety reasons under a certain height Hth or less. It needs to clearly notify the pilot of limiting values such as the drag force Dp of the propeller, the descending rate Vθ and the regenerative electric power Psh corresponding thereto so as not to unintentionally lose the height by increasing the drag force Dp of the propeller, i.e., the descending rate Vθ carelessly by the pilot.

Figure 27:
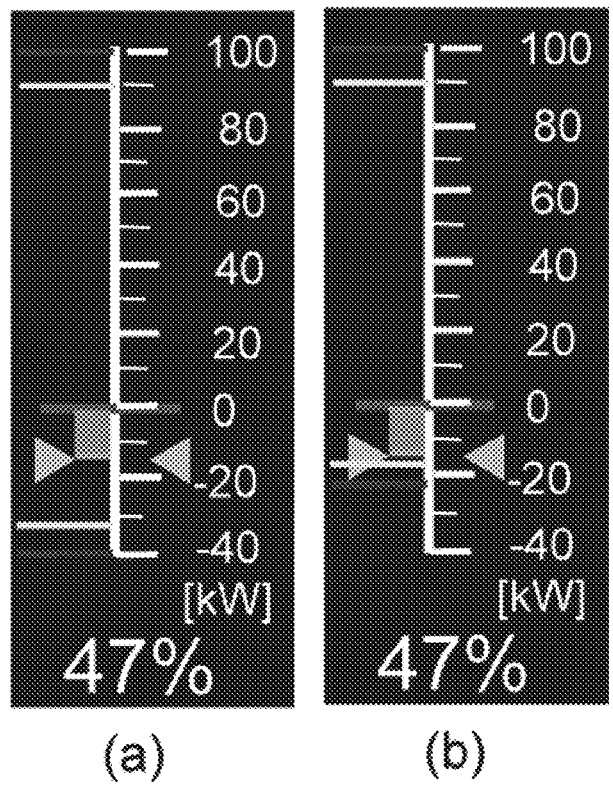
FIG. 27 A reference diagram of illustrative displays of a motor output, a regenerative electric power and a regenerative range.

According to this embodiment, the drive control means 712 clearly shows the allowable range of the regenerative electric power Psh by color such as red or yellow as shown in FIGS. 27 (*a*), (*b*) (although it is represented by a gray scale because of the drawing limitation), based on height information provided from the airframe height detection means 717, and changes the display by the height changed momentarily. Under any flight status, it is possible to notify intuitively a pilot of an output margin of a regenerative electric power at any flying status, which prevents the risk.

Figure 28:
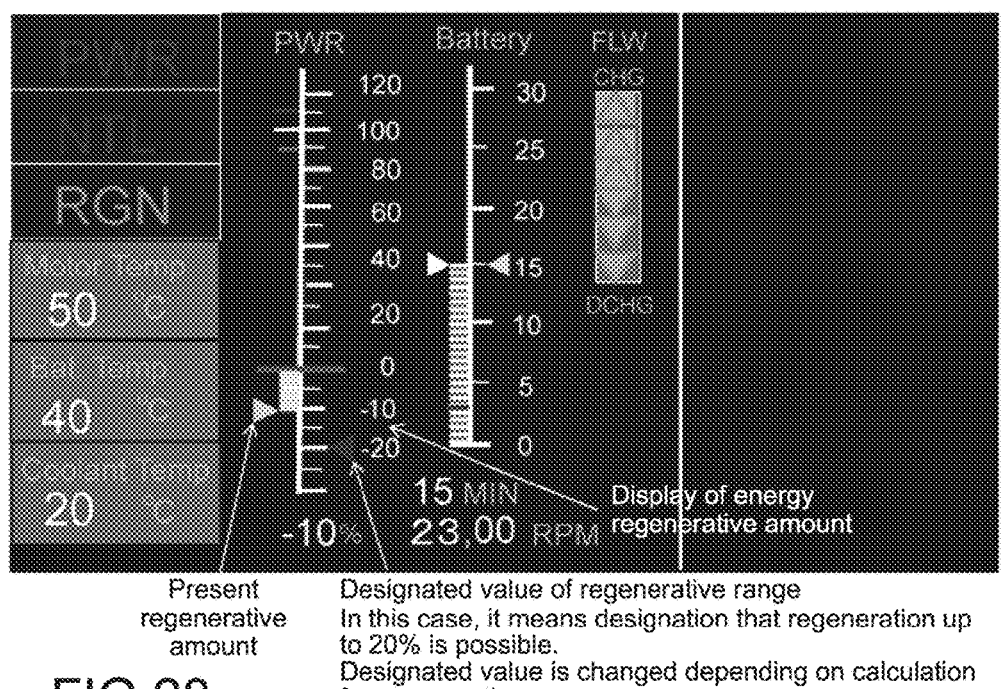
FIG. 28 A reference diagram of an illustrative comprehensive display.
Figure 29:
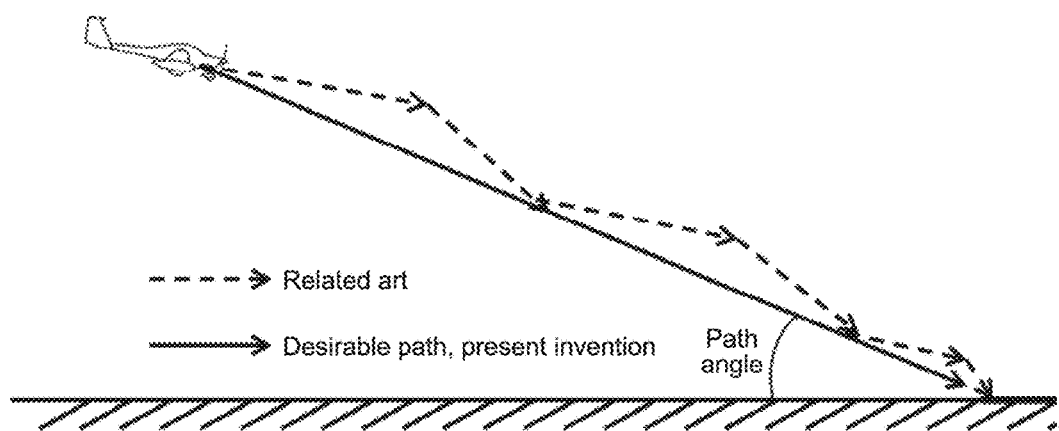
FIG. 29 A reference diagram of illustrating a path angle of an aircraft.

Furthermore, FIG. 28 shows an embodiment of the information display means for comprehensively displaying an operation status of an electric propulsion system in the display system according to the present invention.

At upper left, a status of an electric drive motor output is shown as any of "PWR" (plus area: thrust force control), "NTL" (neutral) and "RGN" (minus area: regenerative control or the propeller efficacy control).

At lower left, actual values of a motor temperature, a buttery temperature and a cooling water temperature are shown.

At center meter display, graphs of an output of the electric drive motor (PWR), a battery capacity (Battery) and a status of charge (FLW) are shown.

In the graph of the output of the electric drive motor (PWR), a maximum value that can be safely regenerated is shown other than the present value (present regenerative amount) in the minus area (regenerative area). Thus, the regenerative range can be easily recognized.

In the display, the following processing is carried out.

Firstly, a regenerative output value is an increasing function of a flight height above the ground, and is a decreasing function of the SOC.

In other words, the higher the flight height is and the lower the SOC is, the wider the regenerative range is.

The regenerative output value is an increasing function of the plus elevator ratio (ascending airflow) during a level flight.

Then, the regenerative range is calculated by the following numerical formula, and the range is displayed.

$$\text{Regenerative range [\%]} = Psh/\text{Pref}(h, SOC, VS) \times 100$$

where
Psh: output,
Pref: output limit value
h: flight height above the ground, and
VS: plus elevator ratio (ascending airflow) during level flight.

As described above, according to the present invention, it is possible to independently control the elevator ratio or the path angle and the airspeed, taking advantage of high responsiveness of the propulsion drive system of the electrified aircraft. It is also possible to operate the drag force of the propulsion drive system and to independently and responsively control the path angle and the descending rate. Furthermore, it is also possible to easily notify information needed for safety control with a false recognition suppressed.

The detection mechanism of the current, the rotation number, the torque, etc., the current detection means, the rotation number detection means may be any of those that can functionally detect or may detect by calculating from other parameters.

DESCRIPTION OF SYMBOLS

100 electrified aircraft
110, 210, 310, 410 propulsion drive system
111, 211, 311, 411 propeller
212, 312 variable pitch mechanism
113, 213, 313, 413 electric drive motor
114, 214, 314, 414 inverter
115, 215, 315, 415 electric power source
120, 220, 320, 420 drive control means
121, 221, 321, 421 driving force operation unit
122, 222, 322, 422 drag operation unit
123, 223, 323, 423 thrust force control unit
130, 230, 330, 430 current detection means
140, 240, 340, 440 rotation number detection means
150, 250, 350, 450 airflow detection means
510, 510A, 610 operation system
511, 511A, 611 propeller
513, 613 electric drive motor
514, 514A, 614 inverter
515, 515A, 615 electric power source 520, 520A, 620 drive control means
530, 630 current detection means
540, 540A, 640 operation means
541 operation position detection sensor
542 lever (operation member)
543 pulley
544 lever slit
545 stopper
546 wire
710, 810, 910 display system
711, 811 propeller
712, 812 drive control means
713, 813 electric drive motor
714, 814 operation means
715, 815 airflow detection means
716, 816 electric power source
717, 817 airframe height detection means
720, 820 information display means
830 internal combustion system

The invention claimed is:

1. An electrified aircraft, comprising:
At least one of a propeller and a fan for propulsion;
an electric drive motor for rotary-driving at least one of the propeller and the fan and for generating an electric power by the rotation of at least one of the propeller and the fan; an operation unit for operating a motor output of the electric drive motor, and operating at least one of the torque and the generated electric power of the electric drive motor as a negative value of the motor output; and
an estimation unit for estimating at least one of a drag force of the propeller, a drag force of the fan, torque of the electric drive motor, and generated electric power of the electric drive motor based on propulsion system parameters of the electric drive motor at a time of generating electric power of the electric drive motor.

2. The electrified aircraft according to claim 1, further comprising:
a control unit for controlling a rotation number and a rotation direction of at least one of the propeller and the fan based on at least one of the drag, torque, and generated electric power estimated.

3. The electrified aircraft according to claim 2, wherein
the propeller or the fan is a variable pitch propeller or a variable pitch fan, and
the control unit controls such that at least one of the propeller and the fan is rotated in the same rotation direction at the time of generating electric power and at the time of propulsion, and a pitch angle at the time of generating an electric power of at least one of the propeller and the fan is shallower than that at the time of propulsion, or a rotation number at the time of generating an electric power is lower than that at the time of propulsion.

4. The electrified aircraft according to claim 3, wherein
the control unit controls torque to a range including both cases that at least one of the propeller and the fan is rotated in the same rotation direction at the time of propulsion to generate an electric power and that at least one of the propeller and the fan is rotary-driven in an opposite direction at the time of propulsion.

5. The electrified aircraft according to claim 2, comprising:
a function to control an airspeed of the electrified aircraft independent of the rotation number and the rotation direction of at least one of the propeller and the fan by operating an aerodynamic device installed on at least one of a wing and a tail.

6. The electrified aircraft according to claim 1, further comprising:
an operation unit for operating a motor output of the electric drive motor, and operating at least one of the torque and the generated electric power of the electric drive motor as a negative value of the motor output.

7. The electrified aircraft according to claim 1, wherein
the operation unit operates at least one of the generated electric power of the electric drive motor as a value proportional to cube of the rotation number of the motor and motor torque at the time of generating an electric power as a value proportional to square of the rotation number of the motor.

8. The electrified aircraft according to claim 1, further comprising:
an airflow detection unit for detecting at least one of an airspeed and a dynamic pressure, wherein
an output of the electric drive motor is increased or decreased depending on at least one of the airspeed and the dynamic pressure detected when the output of the motor is operated by the operation unit as a negative value.

9. The electrified aircraft according to claim 1, wherein
the operation unit is a single operation member.

10. The electrified aircraft according to claim 9, wherein
the operation unit is configured
to operate the operation member from a predetermined position to a predetermined direction and an opposite direction,
to increase the output of the electric drive motor to the operation of the operation member in the predetermined direction, and
to decrease the output of the electric drive motor including a negative value to the operation of the operation member to the opposite direction.

11. The electrified aircraft according to claim 10, wherein
the operation member is operated in the direction where the output of the electric drive motor is decreased including a negative value, and
the output of the motor is increased at an area where the motor is rotated in a direction opposite to a propulsion status of the motor when the operation member is further operated in the same direction.

12. The electrified aircraft according to claim 10, wherein
the operation unit includes a wrong operation prevention mechanism for requesting an operator to an additional operation when the operation member is operated from the predetermined position to the opposite position.

13. The electrified aircraft according to claim 9, wherein
the operation unit includes a plurality of operation position detection sensors each for detecting a position of the operation member, and a failure detection mechanism for detecting a failure of any of a plurality of the operation position detection sensors by comparing outputs of a plurality of the operation position detection sensors.

14. The electrified aircraft according to claim 1, further comprising:
a display unit for displaying at least one of the torque and the generated electric power generation amount of the electric drive motor as a negative value.

15. The electrified aircraft according to claim 14, wherein the display unit displays a recoverable range of regenerative energy recovered by generating electric power by the electric drive motor.

16. The electrified aircraft according to claim 14, wherein the display unit displays at least one of at least one or more values of a maximum value of a generated electric power of the electric drive motor estimated at the time, a maximum value of a motor axis input, a maximum value of a current and a maximum value of torque, an estimated value of a drag force at the time of generating an electric power, an estimated value of an airframe elevator ratio, an estimated value of a path angle and an estimated value of a lift-drag ratio, and processing information thereof.

17. The electrified aircraft according to claim 14, comprising at least one of:
   a motor temperature detection means for detecting a motor temperature of the electric drive motor,
   a battery temperature detection means for detecting a temperature of a battery mounted to the electrified aircraft, and
   a current detection means for detecting a current flowing from the electric drive motor, wherein
   the display unit displays based on data provided from the motor temperature detection means, the buttery temperature detection means and/or the current detection means.

18. A method of controlling a regenerative electric power of an electrified aircraft, comprising:
   estimating at least one of a drag force of a propeller, a drag force of a fan, torque of an electric drive motor, and generated electric power of an electric drive motor based at least one of based on propulsion system parameters of the electric drive motor for rotary-driving at least one of the propeller and the fan for generating electric power by the rotation of at least one of the propeller and the fan; employing an operation unit for operating a motor output of the electric drive motor, and operating at least one of the torque and the generated electric power of the electric drive motor as a negative value of the motor output; and
   controlling at least one of torque and a rotation number of the propeller and the fan based on an estimated result at a time of generating electric power of the electric drive motor.

* * * * *